(12) United States Patent
Ouyang et al.

(10) Patent No.: US 9,590,746 B2
(45) Date of Patent: Mar. 7, 2017

(54) EVALUATING DEVICE ANTENNA PERFORMANCE AND QUALITY

(71) Applicant: Verizon Patent and Licensing Inc., Arlington, VA (US)

(72) Inventors: Ye Ouyang, Piscataway, NJ (US); Carol Becht, Boonton, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 204 days.

(21) Appl. No.: 14/567,044

(22) Filed: Dec. 11, 2014

(65) Prior Publication Data

US 2016/0173211 A1    Jun. 16, 2016

(51) Int. Cl.
*H04B 17/16*     (2015.01)
*H04B 17/318*    (2015.01)
*H04W 24/10*     (2009.01)

(52) U.S. Cl.
CPC ........... *H04B 17/16* (2015.01); *H04B 17/318* (2015.01); *H04W 24/10* (2013.01)

(58) Field of Classification Search
CPC ....... H04M 1/24; H04W 24/00; H04W 24/02; H04W 24/04; H04W 24/06; H04W 24/08; H04W 24/10; H04B 17/15; H04B 17/16; H04B 17/17; H04B 17/18; H04B 17/19; H04B 17/20; H04B 17/21; H04B 17/26; H04B 17/29
See application file for complete search history.

(56) References Cited

U.S. PATENT DOCUMENTS

| 8,983,845 B1* | 3/2015 | Kristjansson | ........... G10L 21/00 |
| | | | 381/58 |
| 9,154,972 B2* | 10/2015 | Guterman | ............. H04W 24/00 |
| 2006/0194552 A1* | 8/2006 | Jin | ......................... H04B 17/21 |
| | | | 455/226.1 |
| 2014/0315495 A1* | 10/2014 | Joseph | .................. H04W 24/08 |
| | | | 455/67.11 |

* cited by examiner

*Primary Examiner* — Anthony Addy
*Assistant Examiner* — Martin Chang

(57) ABSTRACT

A method includes receiving over-the-air (OTA) performance test data measured for a first set of pass computing devices and for a second set of fail computing devices, measuring a first set of training data for the first and second set of computing devices during a plurality of KPI tests, measuring a second set of training data for a particular computing device, determining which ones of the plurality of KPIs qualify as clustering features, and determining a first set of KPI centers, a second set of KPI centers, and a third set of KPI centers, determining a first and a second dissimilarity distance separating the first set and the second set of computing devices from the particular device, respectively. The method further includes determining whether the first dissimilarity distance is greater than second dissimilarity distance to qualify the particular computing device to pass the OTA test.

20 Claims, 23 Drawing Sheets

Get the testing data with the selected features

*TestingDataForValidation.csv

|    | CallRetentionRate | RSSI       | TxPower    | RSRP     | RSRQ     | Cluster     |
|----|-------------------|------------|------------|----------|----------|-------------|
| 1  | 0.968869?         | -95.08989  | 2.890078994| -91.01965| -6.935755| NewDevice1  |
| 2  | 0.952994 6        | -102.600667| 11.104461065| -77.84475| -9.119261| NewDevice1  |
| 3  | 0.974174 3        | -102.448837| 7.240827490| -85.69307| -9.015643| NewDevice1  |
| 4  | 0.920172 4        | -102.967756| 12.487961448| -81.69387| -9.807408| NewDevice1  |
| 5  | 0.984269 4        | -95.173396 | 9.962776660| -95.15750| -10.608080| NewDevice1 |
| 6  | 0.984441 3        | -100.121222| 4.12698712 4| -79.90439| -14.204588| NewDevice1 |
| 7  | 0.960822 2        | -99.95414  | 4.462358905| -87.59729| -8.147464| NewDevice1 |
| 8  | 0.983257 9        | -99.233119 | 11.508596602| -78.57030| -8.196711| NewDevice1 |
| 9  | 0.995123 4        | -99.927782 | 9.018249670| -87.21211| -7.852502| NewDevice1 |
| 10 | 0.945419 1        | -98.648815 | 11.012741142| -89.50294| -10.104399| NewDevice1 |
| 11 | 0.966687 5        | -105.54292 | 9.904573961| -84.59036| -17.618287| NewDevice1 |
| 12 | 0.965192 0        | -104.461 30| 9.690035663| -80.92763| -4.642059| NewDevice1 |
| 13 | 0.973154 3        | -103.791759| 4.465257727| -92.13729| -17.410970| NewDevice1 |
| 14 | 0.975366 4        | -96.890777 | 4.285047787| -76.59805| -7.078929| NewDevice1 |
| 15 | 0.975827 9        | -101.463227| 9.900792511| -84.36103| -15.845830| NewDevice1 |
| 16 | 0.952310 8        | -101.64271 | 9.317569972| -84.05103| -17.662801| NewDevice1 |
| 17 | 0.944044 8        | -197.78622 | 7.47760588 0| -82.75925| -9.553459| NewDevice1 |
| 18 | 0.961372 1        | -101.01357 | 8.277408080| -81.99649| -6.141930| NewDevice1 |
| 19 | 0.998502 6        | -98.52796  | 8.277408080| -86.49616| -6.246535| NewDevice1 |

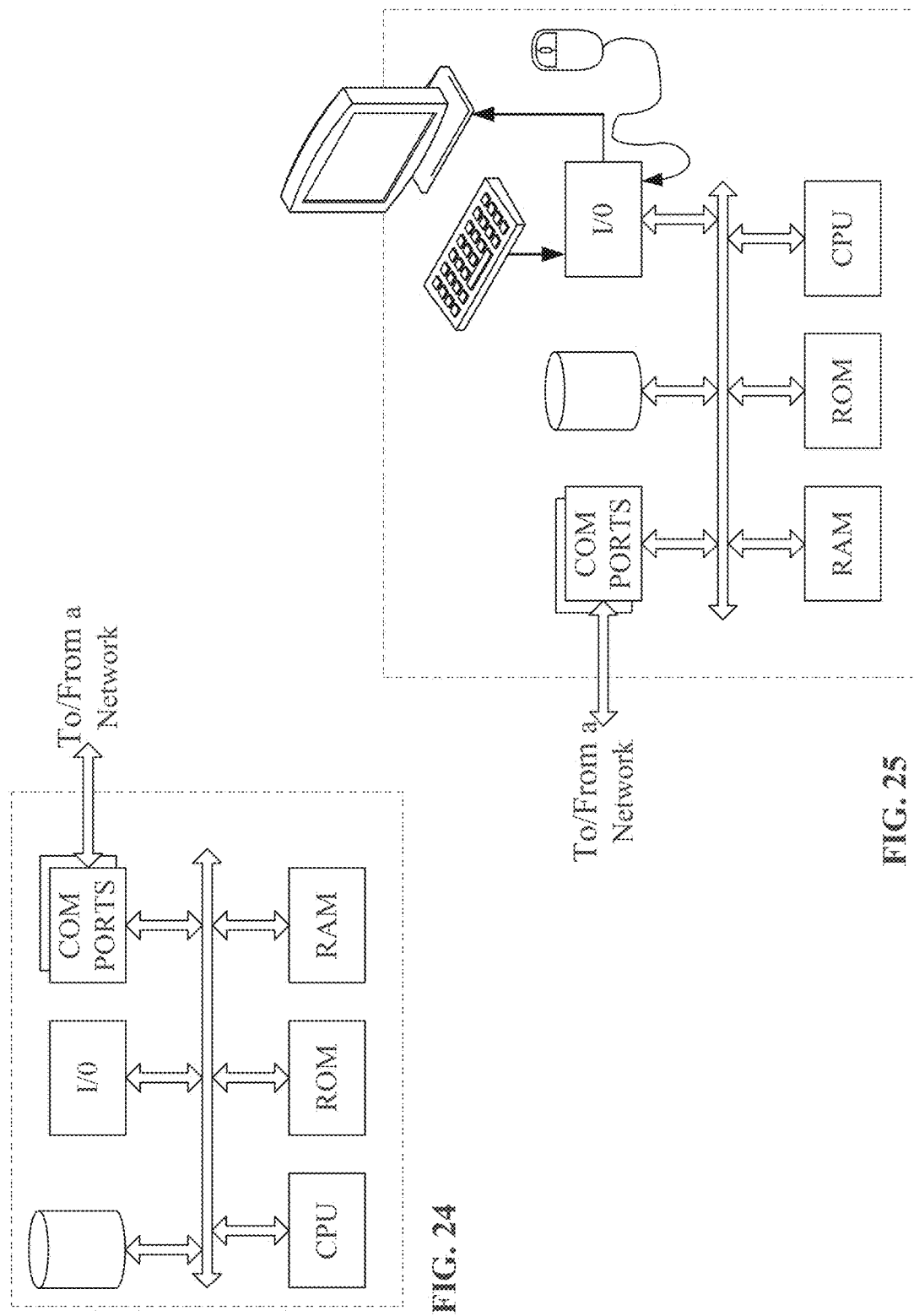

EVALUATING DEVICE ANTENNA PERFORMANCE AND QUALITY

BACKGROUND

In recent years, mobile device usage has significantly increased. Mobile devices, such as smartphones, are being designed and manufactured at a rapid rate to satisfy customer demand. Organizations, such as wireless network providers, typically request that every new mobile device type (model) passes an over-the-air (OTA) performance test before being launched commercially by the mobile device manufacturer. However, the manufacturing of ready-to-use mobile devices may deviate from the manufacturing of the pre-commercial mobile device model. As such, the antenna performance of a newly manufactured (post-commercial) mobile device may change from that of the pre-commercial mobile device model that passed the OTA performance test. Accordingly, wireless network providers may want to make sure that only post-commercial mobile devices that can pass the OTA performance test are added to their networks. However, it can be quite costly to subject every post-commercial mobile device to an OTA performance test As the foregoing illustrates, a new approach for evaluating device antenna performance and quality of a newly manufactured mobile device without subjecting it to an OTA performance test may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 17 illustrates a third data set that includes testing data of the selected significant KPI features;

FIG. 18 illustrates a first data table that shows a classification accuracy rate for 400 devices that varies based on changes of measurement samples per testing device;

FIG. 19 illustrates a second data table that shows a classification accuracy rate for 1000 devices that varies based on changes of measurement samples per testing device;

FIG. 24 illustrates a simplified functional block diagram of a computer that may be configured as a host or server, for example, to function as the analytics engine in the system of FIG. 1;

FIG. 25 illustrates a simplified functional block diagram of a personal computer or other work station or terminal device.

DETAILED DESCRIPTION OF THE DRAWINGS

Figure 1:
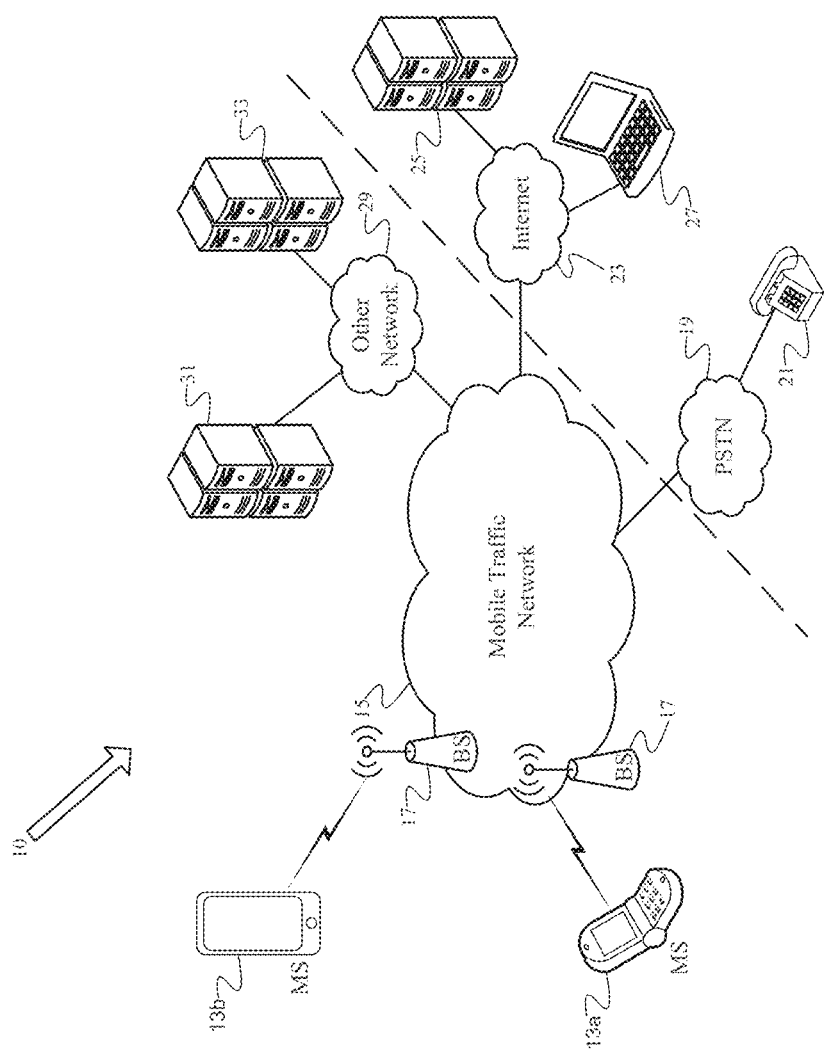
FIG. 1 illustrates a high-level functional block diagram of an exemplary system of networks/devices that provide various communications for mobile stations and support an example of evaluating device quality.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Over the past several years, methodologies have been developed for over-the-air (OTA) performance testing of active wireless devices such as mobile phones to determine their transmit powers and receiver sensitivities. Prior to launching commercially a new device type (i.e., a pre-commercial device), wireless network providers request that the new device type passes an OTA test. Accordingly, wireless network providers or the well-known Cellular Telecommunications and Internet Association (CTIA) wireless association perform a standard total isotropic sensitivity (TIS) and a standard total radiated power (TRP) test on every new device type provided by an original equipment manufacturer (OEM).

As known to one of ordinary skill in the art, TIS of a device antenna is the smallest amount of power that can be input to the device receiver, so that the receiver can still maintain a reliable communication, and TRP is a measure of how much power is radiated by a device antenna when the antenna is connected to an actual radio (or transmitter).

The new device type can pass the TIS/TRP test by showing desirable (e.g., good) results in antenna radio frequency (RF) performance. These desirable results represent an acceptable and reliable level of performance by the antenna of the new device. However, after launching commercially the new device type that passed the TIS/TRP test, a manufacturing quality of similar post-commercial devices may deviate from that of the pre-commercial device type, which may lead to a change of the antenna performance. Because it can be quite costly to TIS/TRP test every post-commercial device by wireless network providers, there is a need for a process that determines whether a new device is likely to have an antenna with a desirable performance level without subjecting it to a TIS/TRP test.

Accordingly, the implementations disclosed herein can evaluate antenna performance and quality of a newly manufactured (post-commercialized) device based on measured antenna performance data of similar pre-commercialized (pre-launched) devices. This helps wireless network providers better determine whether the new device antenna is likely to provide the user with an acceptable and reliable level of antenna performance.

The disclosed implementations construct a novel process model to analyze an antenna performance of a device, classify the device to an antenna poor quality group or to an antenna normal quality group, and probabilistically evaluate the likelihood that a device, which has no antenna performance data, will or will not have a reliable antenna that does not transmit signals below a predetermined power level and receive signals at a predetermined strength.

The novel process model is a centroid-based similarity process model for classifying a quality of a new device antenna, for example as a good antenna or as a poor antenna. The disclosed implementations provide a process model to determine features that are fed into the classification process model because they support a desirable degree of separation for the two device groups (clusters), which include the antenna poor quality group and the antenna normal quality group. As such, in accordance to the present disclosure, the developed classification process model is configured to dichotomously classify a device antenna quality.

Reference now is made in detail to the examples illustrated in the accompanying drawings and discussed below.

FIG. 1 illustrates a system 10 offering a variety of mobile communication services, including communications for evaluating a device antenna quality. The example shows simply two mobile stations (MSs) 13a and 13b as well as a mobile communication network 15. The stations 13a and 13b are examples of mobile stations for which antenna quality may be evaluated. However, the network will provide similar communications for many other similar users as well as for mobile devices/users that do not participate in methods for evaluating antenna qualities. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the 3GPP for 4G Long Term Evolution (LTE) or other standards used for public mobile wireless communications. The mobile stations 13a and 13b may be capable of voice telephone communications through the network 15, and for methods to evaluate antenna quality, the exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13a and 13b via the Internet 23 may be with devices like those shown as server 25 and user terminal 27 as well as with a variety of other types of devices or systems capable of data communications through various interconnected networks. The mobile stations 13a and 13a also can receive and execute applications written in various programming languages, as discussed more hereafter.

Mobile stations 13a and 13b can take the form of portable handsets, smart-phones or personal digital assistants, although they may be implemented in other form factors. Program applications, including an application to assist in methods to evaluate antenna quality can be configured to execute on many different types of mobile stations 13a and 13b. For example, a mobile station application can be written to execute on a binary runtime environment for (BREW-based) mobile station, a Windows Mobile based mobile station, Android, i-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as those serving mobile stations 13a and 13b, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13a and 13b that are served by the base station 17.

The radio access networks can also include a traffic network represented generally by the cloud at 15, which carries the user communications and data for the mobile stations 13a and 13b between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13a or 13b communicates over the air with a base station 17 and through the traffic network 15 for various voice and data communications, e.g. through the Internet 23 with a server 25 and/or with application servers 31. If the mobile service carrier provides a service for evaluating antenna performance, the service may be hosted on a carrier-operated application server 31. The application server 31 may communicate via the networks 15 and 29. Alternatively, the evaluation of device antenna quality may be determined by a separate entity (alone or through agreements with the carrier), in which case, the service may be hosted on an application server such as server 25 connected for communication via the networks 15 and 23. Server such as 25 and 31 may provide any of a variety of common application or service functions in support of or in addition to an application program running on the mobile station 13. However, for purposes of further discussion, we will focus on functions thereof in support of evaluating antenna quality. For a given service, including the evaluation of an antenna quality, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13a or 13b, the server application provides appropriate information to the authentication server 33 to allow server 33 to authenticate the mobile station 13a or 13b as outlined herein. Upon successful authentication, the server 33 informs the server application 31, which in turn provides access to the service via data communication through the various communication elements (e.g. 29, 15 and 17) of the network 10.

Figure 2:
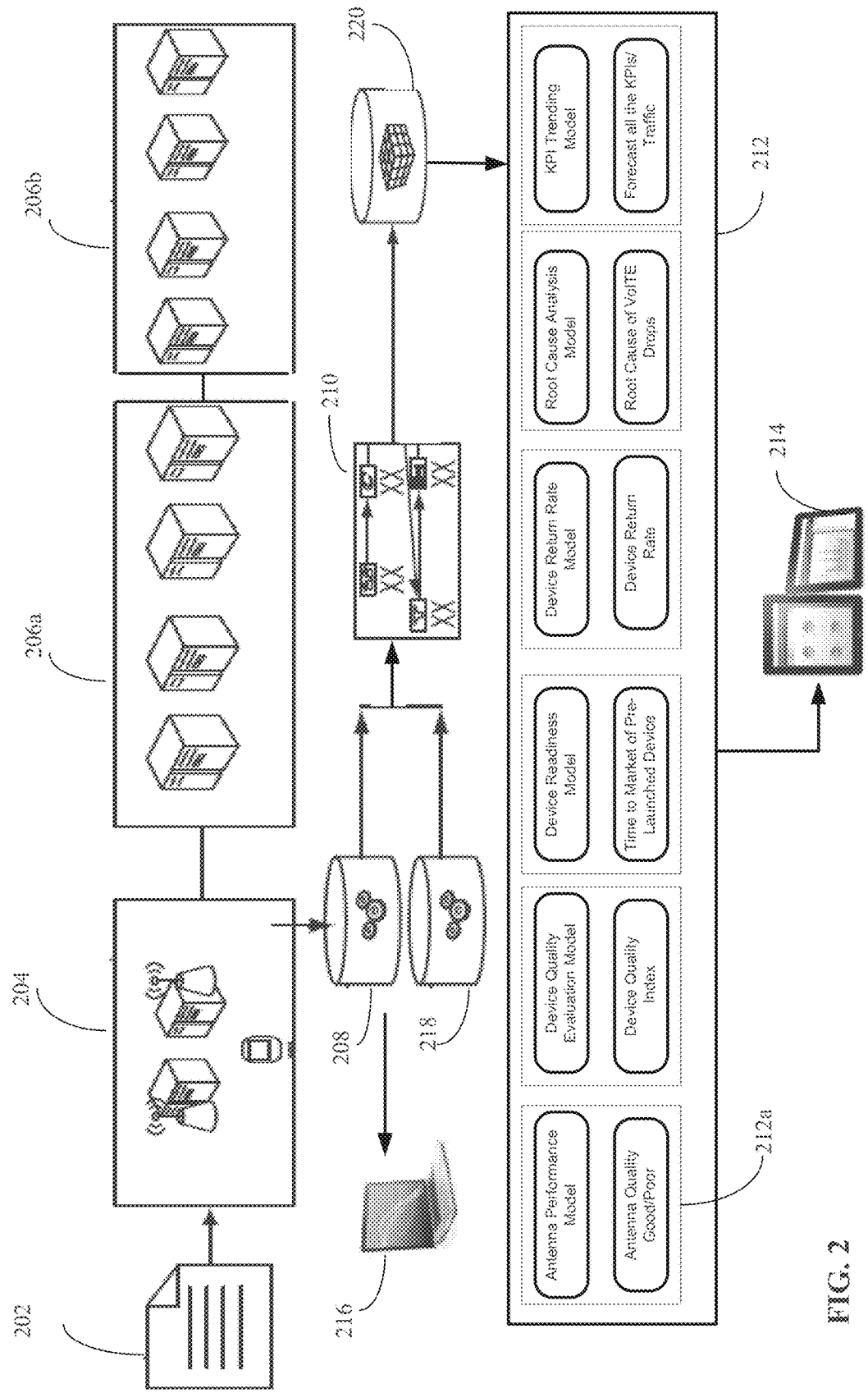
FIG. 2 illustrates an exemplary overall framework that can be used to obtain and store operational parameters related to a mobile device.

FIG. 2 illustrates an exemplary overall framework 200 that can be used to obtain and store operational parameters related to the mobile station 13a. FIG. 2 illustrates test plans 202, an original equipment manufacturer (OEM) lab 204, two network provider labs 206a and 206b, OnBoard Diagnostics Management (OBDM) logs (e.g., KPI logs) 208, an extraction transformation loading (ETL) module 210, an analytics engine 212, a graphical user interface module (GUI) module 214, a log analysis device 216, new device breed supply chain logs 218, and a data warehouse 220. In one example, analytics engine 212 may be located in server 31. Moreover, as shown, in accordance with the present disclosure, analytics engine 212 includes a dichotomous classification model (application) 212a that is configured to dichotomously classify an antenna quality (e.g., good or poor) of a new device.

In some implementations, the framework of FIG. 2 may be implemented by at least one organization, such as a wireless network provider. In this example, the wireless network provider may operate the framework 200 to determine the quality of antennas of mobile devices that have been manufactured by certain manufacturers for customers of the wireless network provider. In other implementations, the framework 200 may be implemented by any other organization or company to evaluate a quality of an antenna of any device. In other words, the framework 200 is not limited to wireless network providers and mobile devices. Furthermore, it is to be appreciated that one or more components illustrated in FIG. 2 may be combined. Operations performed by one or more components may also be distributed across other components.

With reference to FIG. 2 and in some implementations, test plans 202 may include, but are not limited to, data and associated guidelines on how to test the mobile station 13a (or any other device) for antenna quality. The test plans 202 may include machine-readable instructions as well as human-readable instructions. For example, the test plans 202 may be read by a human tester or may be provided to a processor-based computer to perform one or more tests on the mobile station 13a. Such a test may be performed by a processor-based computer to determine certain operational parameters and/or key performance indicators (KPI) of the mobile station 13a. In some examples, testing of the mobile station 13a may be performed at OEM lab 204. The OEM lab 204 may be a testing facility that is operated by a manufacturer of the mobile station 13a. The OEM lab 204 may be operated by one or more human testers and may include one or more testing stations and testing computers. The devices that are tested at the OEM lab 204 may be designed by a wireless network provider and manufactured by the OEM. The OEM may provide tested prototypes of the mobile station 13a prior to the launch of the mobile station 13a. The tested prototypes may meet particular quality or performance thresholds that may have been provided by the wireless network provider to the OEM. The test plans discussed above may include such quality or performance thresholds. Each of the wireless network provider labs 206a and 206b may be a testing facility similar to the OEM lab 204 but may be operated by a wireless network provider that provides network services for the mobile station 13a. The wireless network provider labs 206a and 20b may communicate with the components of the analytics engine 212. Simply stated, one purpose of OEM lab 204 and wireless network provider lab 206 can be to perform one or more tests or measurements on mobile station 13a to determine operational parameters, such as RF parameters, associated with the mobile station 13a. The measurements can be provided to analytics engine 31. It is to be appreciated that the implementations are not limited to a single mobile station 13a, but can operate to test and evaluate any number of mobile stations in sequence or in parallel.

In some implementations, KPI logs 208 may include, but are not limited to, data from OEM lab 204. KPI logs 208 may also include data from wireless network provider labs 206a and 206b. As discussed above, data from OEM lab 204 and the wireless network provider labs 206a and 206b can include, but are not limited to, operational parameters associated with the mobile station 13a. In some implementations, the data from KPI logs 208 can be retrieved or extracted by ETL module 210. ETL module 210 may extract, transform and load transformed data into data warehouse 220. Data transformations may include, but are not limited to, re-formatting of the data into a common or open data format.

In some implementations, ETL module 210 may receive data as data files in a particular data format. The ETL module 210 may use a scheme to extract needed data attributes from the received data files, massage (e.g., format) the data, transform the data, and finally load to or store the data in the data warehouse 220 of the wireless network provider. Alternatively, ETL module 210 may receive data as data files in another particular data format (e.g., a comma-separated values (CSV) file). The data warehouse 220 may also include metadata associated with the data received from ETL module 210. Metadata can specify properties of data. In this way, the data warehouse 220 may include, but is not limited to, transformed data received from OEM lab 204 and the wireless network provider labs 206a and 206b. The data from the data warehouse 220 may be read by the analytics engine 212 to evaluate antenna quality of the mobile station 13a using the exemplary processes/methods discussed below. As such, in some implementations, data from the data warehouse 220 may be provided by the data warehouse 220 to the analytics engine 212. The metadata in the data warehouse 220 can define data attributes as well as their relations. The metadata may include two types of metadata: performance data attribute and a configuration data attribute. Performance data attributes may include, but are not limited to, TIS and TRP thresholds, RF indicators, accessibility KPI thresholds, retain-ability KPI thresholds, mobility KPI thresholds, etc. Configuration data attributes may include, but are not limited to, device name, OEM name, device type, hardware configuration parameters, software parameters, sales data, antenna quality data, etc. Once data attributes are defined in a metadata file, their relations can be defined.

Figure 4:
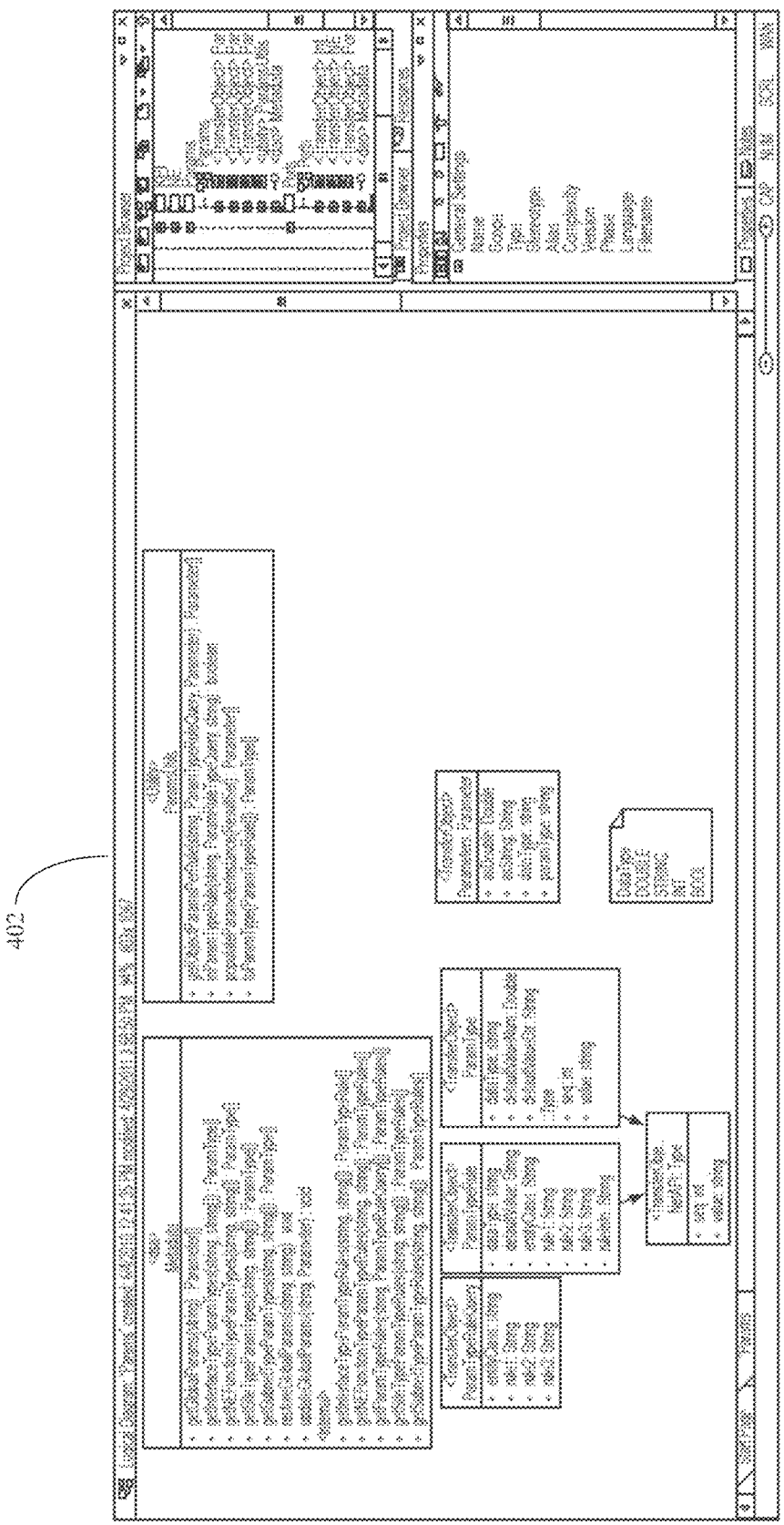
FIG. 4 illustrates an exemplary interface to define relations between data attributes in the metadata.

FIG. 4 illustrates an exemplary interface 402 to define the relations between data attributes in the metadata. The interface 402 can be an easy-to-use web-based interface. For example, a user may use the project browser of the interface that is configured to select one or more performance data parameters (e.g., KPIs) and then use logical diagrams to configure mappings between both standard and proprietary data formats. Furthermore, the interface 402 can allow customizing conversion of data types. In addition, a visualization of derived mappings between source and target formats can also be provided.

In some implementations, analytics engine 212 includes one or more processors, storage and memory to process one or more algorithms and statistical models to evaluate quality of the mobile station 13a, such as a quality of its antenna. In some implementations, analytics engine 212 may train and mine the data from ETL module 210. As an example, a training set can be a set of data used to discover potentially predictive relationships. Training sets are used in artificial intelligence, machine learning, intelligent systems, and statistics. A training set can be implemented to build an analytical model, while a test (or validation) set may be used to validate the analytical model that has been built. Data points in the training set may be excluded from the test (validation) set. Usually a dataset is divided into a training set, a validation set (and/or a 'test set') in several iterations when creating an analytical model. In this way, for example, analytics engine 212 may determine models to evaluate device antenna quality. In some implementations, open interfaces (e.g., application programming interfaces (APIs)) may be provided to vendors for reading/writing data between ETL module 210 and analytics engine 212 and for visualizing analytics results between analytics engine 212 and GUI 214. In some implementations, the wireless network provider may provide access to the analytics engine 212 to a third-party vendor.

In some implementations, data may be processed incrementally by analytics engine 212 for instantaneous learning. Incremental learning is a machine learning paradigm where a learning process takes place whenever new example(s) emerge and adjusts what has been learned according to the new example(s). Incremental learning differs from traditional machine learning in that incremental learning may not assume the availability of a sufficient training set before the learning process, the training examples may instead be assumed to appear over time.

Figure 3:
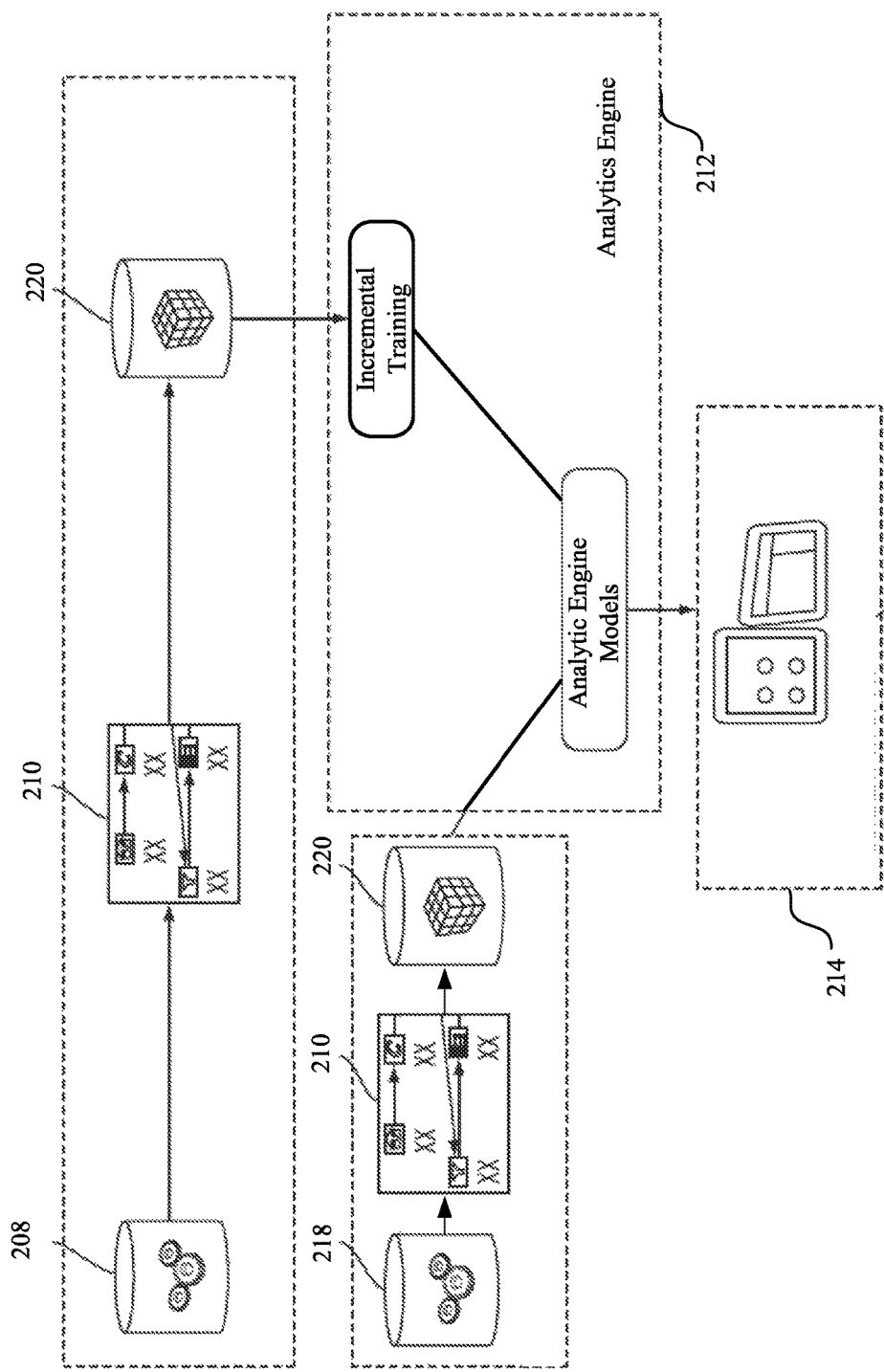
FIG. 3 illustrates exemplary incremental learning in an analytics engine.

Based on this paradigm, the algorithms utilized by the analytics engine 212 may be automatically updated by re-training the model processed by the analytics engine 212. In some implementations, a dynamic sliding window method may be used to provide data from the ETL module 210 to the analytics engine 212 for algorithm training by analytics engine 212. The dynamic sliding window may be used by the ETL module 210 to incrementally provide, for example, operational parameters from the mobile station 13a to the analytics engine 212. For example, and with reference to FIG. 3, analytics engine 212 may receive data incrementally from ETL module 210 and data warehouse 220 as well as data from an KPI logs 208 and new-breed supply chain logs 218. Analytics engine 212 can incrementally auto-learn and update algorithms for mathematical models so that the models conform to latest data received from the ETL module 210.

One or more outputs of the analytics engine 212 may be provided to GUI 214 for display. As an example, GUI 214 may be rendered on a mobile device (e.g., tablet computer, smartphone, etc.) that may display data provided by analytics engine 212. In some implementations, GUI 214 can be used to visualize analytical results from analytics engine 212. As an example, results from analytics engine 212 may be visualized as terms of charts, animations, tables, and any other form of graphical rendering.

Supply chain logs 218 can store data related to antenna quality of devices. In some implementations, the wireless network provider can provide device antenna data extracted from a supply chain dashboard associated with the supply chain logs 218 in a comma-separated values (CSV) file (i.e., .CSV file). Queries and scripts may be run by ETL module 210 to extract raw data from the supply chain logs 218 and save the data as .CSV files. ETL module 210 may accept and feed the data to the analytics engine 212 for further processing.

In some implementations, ETL module 210 can define a unified target file. Each data attribute in metadata can be mapped by the ETL module 210 to a given column in the target file. The target file is generated as the output file by the ETL module 210 and then provided by the ETL module 210 to the analytics engine 31 for further data mining and data processing. This target file can be utilized by the analytics engine 212 for statistical analysis (e.g., statistical analysis of the mobile station 13a). In some implementations, the ETL module 210 may need to split the target file into several files such as a performance file, a configuration file, etc. The target file may be split when the file size is larger than a specified threshold value. The performance file may include data related to performance of hardware (e.g., memory components) and software (e.g., executing applications) of the mobile station 13a. The configuration file may include data associated with certain device settings (e.g., user defined settings) of the mobile station 13a.

Figure 5:
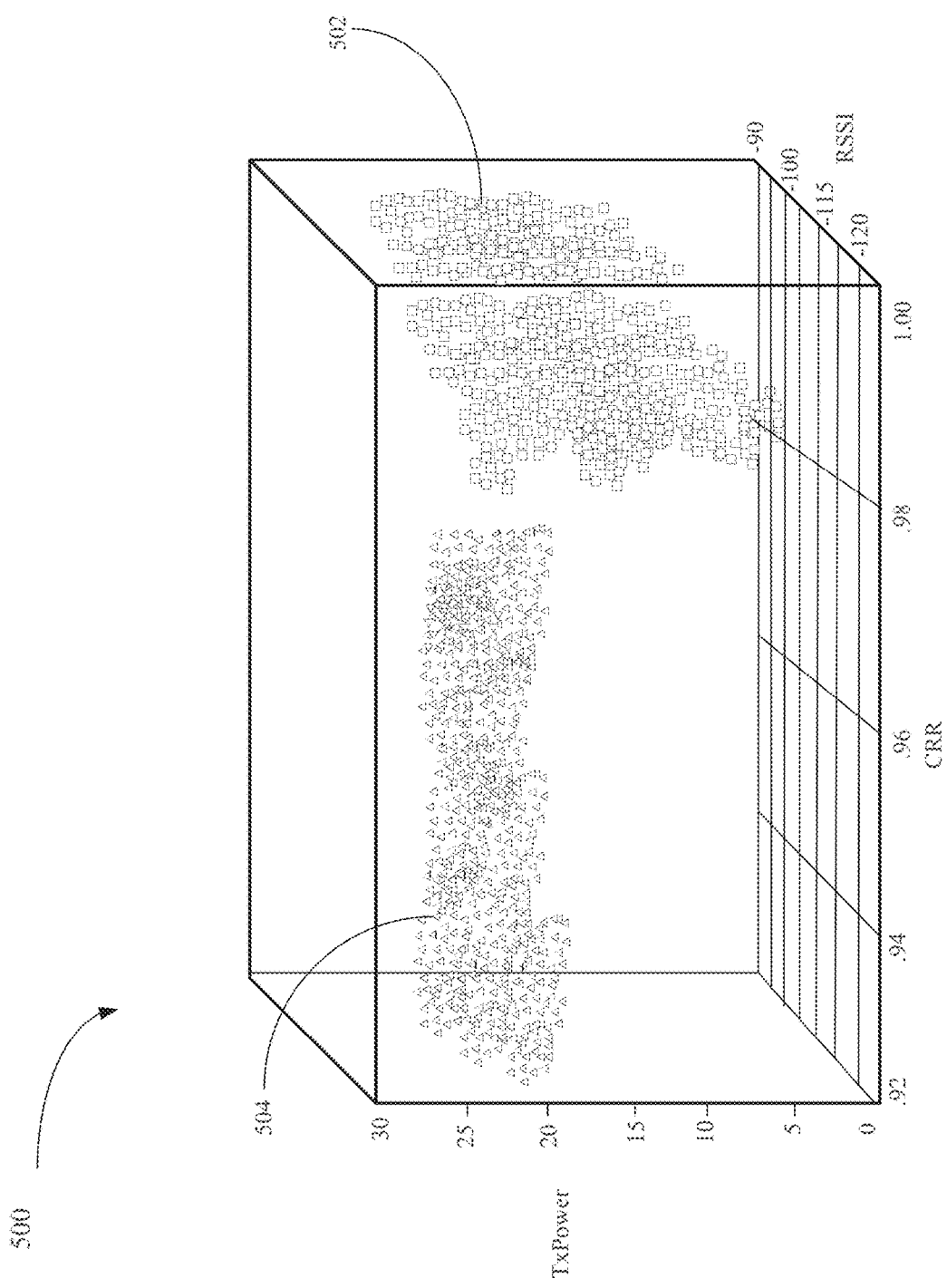
FIG. 5 illustrates a three-dimensional graph that displays performance data of good and bad antennas of pre-commercially manufactured devices.

FIG. 5 illustrates a three-dimensional graph 500 that displays performance data of good and bad antennas of pre-commercially manufactured devices. As shown, the performance data includes three parameters, which are displayed as the names of the three axes of the graph 500. The three parameters include a transmitted signal power (TxP) parameter, a call retention rate (CRR) parameter, and a received signal strength indicator (RSSI) parameter. The dimensions in the graph are for the purpose of illustration only; other parameters and greater or fewer number of parameters may be used. As shown, the pre-commercially manufactured devices include a first group of devices, shown as cluster 502, whose antennas passed the TIS/TRP test, and a second group of devices, shown as cluster 504, whose antennas failed the TIS/TRP test.

Figure 6:
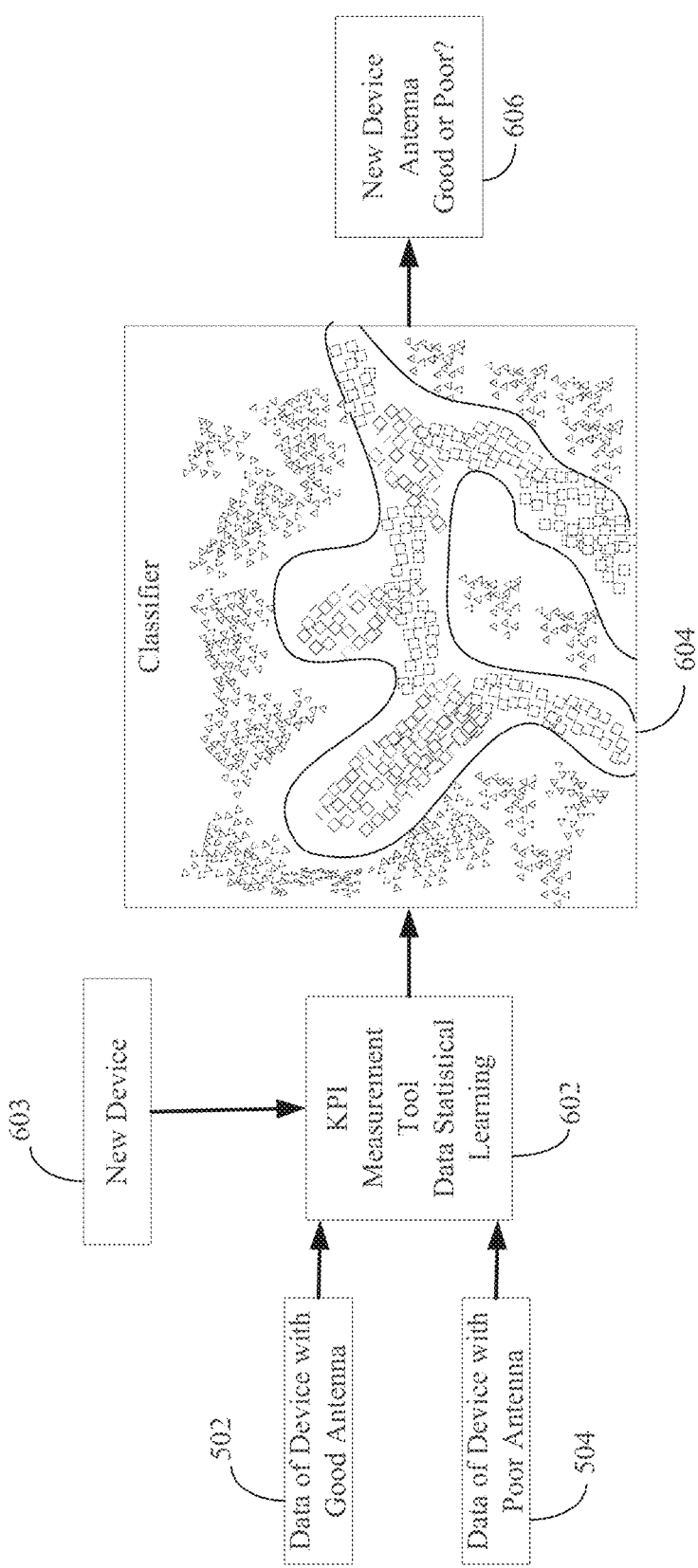
FIG. 6 illustrates a schematic diagram of an antenna classification model in accordance with the present disclosure.

In accordance with the present disclosure, in order to determine the quality of an antenna of a post-commercially manufactured device, the classification model is configured to be trained to generate a classifier module using TIS/TRP test data, illustrated in FIG. 5, associated with pre-commercially manufactured devices that are model-wise similar to the post-commercially manufactured device. For example, and with reference to FIG. 6, the two groups of devices 502 and 504, which passed or failed in the TIS/TRP test, respectively, are connected to a KPI measurement tool 602, which can generate measured KPIs. The measured KPIs obtained from those devices 502, which passed the TIS/TRP test, are collected as training data for a classifier module 604. In addition, the measured KPIs obtained from the devices 504, which failed the TIS/TRP test, are also collected as training data for classifier module 604. The measured KPIs may include a CRR, an RSSI, a TxPower, a reference signal received power (RSRP), a reference signal received quality (RSRQ), a signal-to-interference-plus-noise ratio (SINR), a physical downlink shared channel block error rate (PDSCH-BLER), and a received signal power (RxPower) and the other measured KPIs.

Based on its passing or failing the TIS/TRP test, each device of the two groups/clusters 502 and 504 is labelled either as a "pass device" or as a "fail device." In accordance with the present disclosure, the process learning techniques are leveraged to analyze/study the training data along with the device labeling. As such, a difference between good (pass) devices and poor (fail) devices are derived through the learning process. Once the classfier module 604 is generated, the measured KPI data of a given post-commercially manufactured device, hereafter referred to as a new device 603, can be feed to the classifier module 604. The classifier module 604 after studying the measured KPIs captured for the given new device can determine whether this new device will pass or fail in a potential TIS/TRP test.

Figure 7:
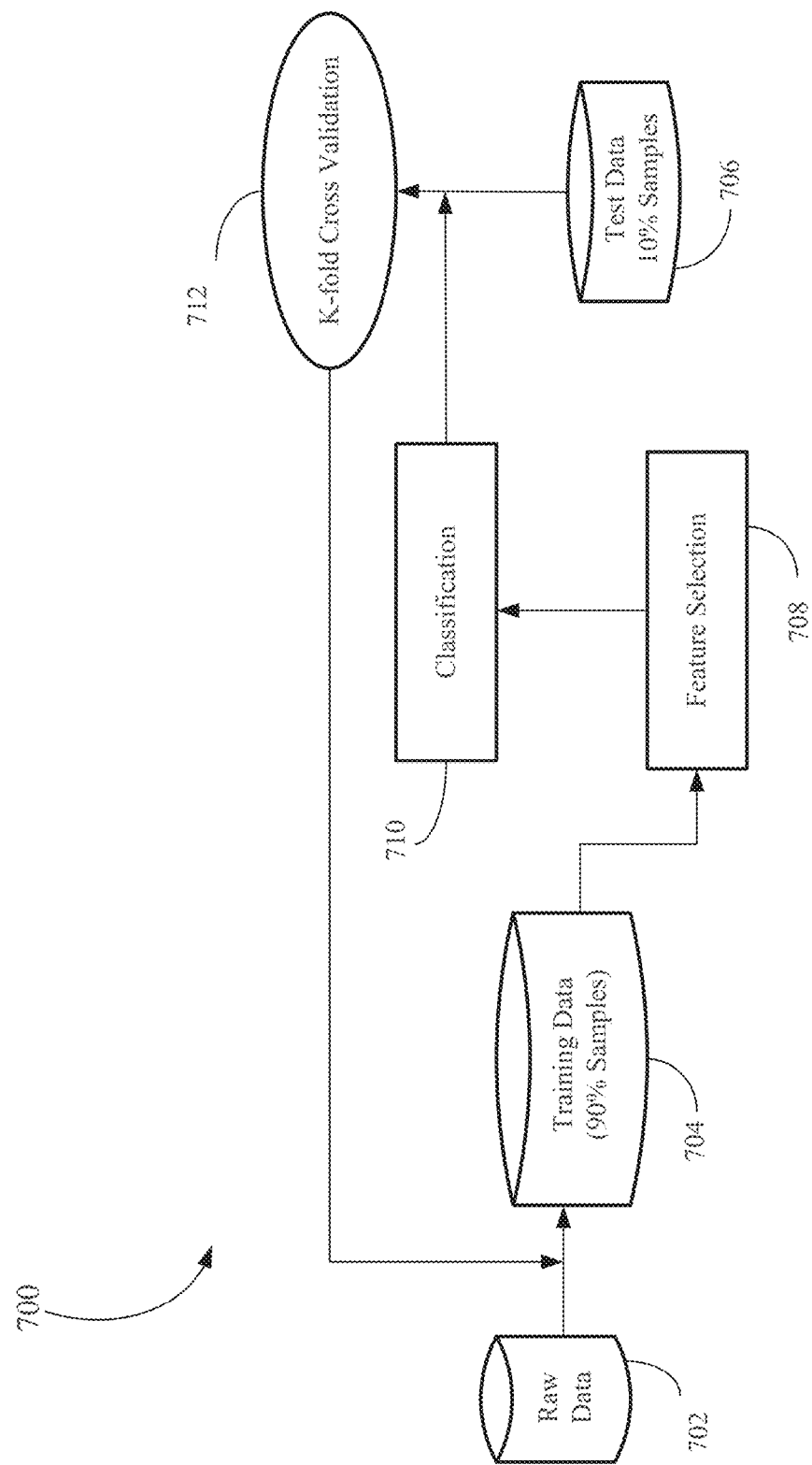
FIG. 7 illustrates a schematic block diagram of a process performed by a classifier module in accordance with the present disclosure.

FIG. 7 illustrates a schematic block diagram of a classifying process 700 performed by classifier module 604 in accordance with the present disclosure. In one implementation, classifying process 700 is configured to further classify the pre-commercially manufactured devices to 502 and 504 clusters based on selected KPI metrics. As shown in FIG. 7, raw data, which includes both measured training data, i.e., measured KPI data of good antenna devices 502 and of poor antenna devices 504, is stored in a data base 702 of classifier module 604. The provided raw data is split randomly into two groups of data. In one implementation, a first group of data, which is configured to include ninety percent (90%) of the raw data, is selected as a training data set, and a second group of data, which is configured to include ten percent (10%) of the raw data, is selected as a test data set. Alternatively, the training data set and the test data set may include respectively different percentages than 90% and 10%, which still amount together to 100% of the raw data.

During the classification process 700 performed by a processor of analytics engine 212, the training data set is provided to a training data storage component 704 of analytics engine 212, and the test data set is provided to a test data storage component 706 of analytics engine 212. In accordance with the present disclosure, process 700 is configured to perform a feature selection that serves to select the best KPI metrics from the training data set that enable a further classification of the pre-commercially manufactured devices 502 and 504 into two device clusters, e.g., good antenna cluster and poor antenna cluster. The selection of the best KPI metrics includes determining a KPI's degree of separation between the two device clusters, and verifying whether a KPI effectively distinguishes the two device clusters. Regarding the degree of separation between the two device clusters, the feature selection 708 is configured to select KPIs that provide a predetermined high variance between the two device clusters, and discards KPIs with a low discrimination between the two device clusters. Hereafter, this feature selection process will be referred to a spatial silhouette distance process.

As stated above, once the best KPI metrics have been selected based on the predetermined high variance between the two device clusters, process 700 is configured to generate a classification 710 of the pre-commercially manufactured devices into either a good antenna cluster or a poor antenna cluster based on their respective RF performance. Moreover, this classification process is configured to determine for each selected KPI a KPI-based centroid for each of the two clusters. Using these KPI-based centroids, as discussed in detail hereafter, process 700 is configured to evaluate for each KPI a KPI distance between a new device and a good antenna cluster, and between the new device and the poor antenna cluster. Using these KPI distance evaluations, process 700 is configured to determine o which one of the two clusters the new device is categorized to.

In accordance with the present disclosure, once the classification process is completed, process 700 is configured to perform an incremental training that involves repeating both the feature selection process and the classification process a predetermined number of times, each time using a different training data set that is also randomly selected from the raw data set. For example, two different training data sets may include the same 80% of the raw data set and a different 10% of the remaining 20% of the raw data set. This incremental training serves to validate process 700 by minimizing a potential bias from a onetime training, and hence enhance the reliability of the antenna classification model. In one example, this incremental training can be referred to as a K-Fold validation process 712 when it is repeated "k" times. As such, when K is equal to 10, the validation process can be referred to as a 10-Fold validation process.

Figure 8:
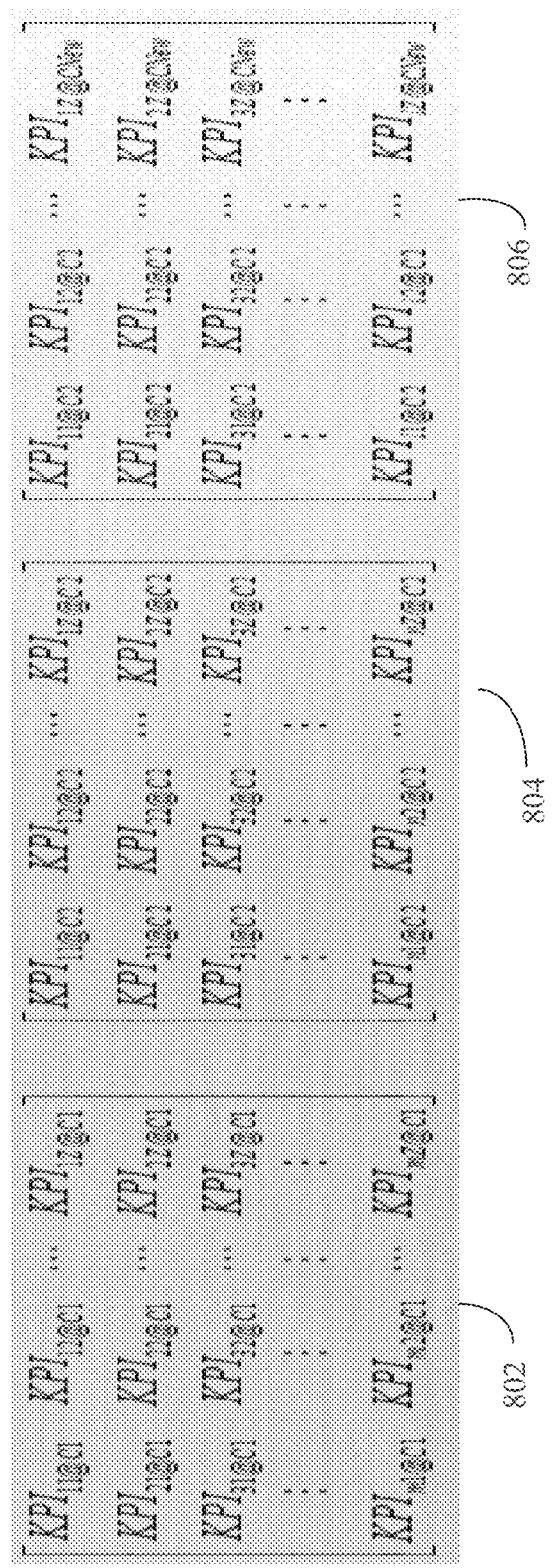
FIG. 8 illustrates three matrices, each of which include key performance indicators for a good antenna device cluster, a poor antenna device cluster, and a new device cluster.

As shown in FIG. 8, a matrix 802 includes data of a good antenna device cluster that correspond to a "z" number of KPI candidates, which were measured "m" times. Also shown, a matrix 804 includes data of a poor antenna device cluster that correspond to the "z" number of KPI candidates that were measured "n" times. Moreover, a matrix 806 is shown that includes data of a new device cluster that corresponds to the "z" number of KPI candidates that were measured "1" times. Hereafter, matrices 802, 804, and 806 will be referred to as matrix C1, matrix C2, and matrix CNew, respectively. In matrix C1, the measured KPI candidates of the C1 cluster are shown as $KPI_{ij@C1}$ with "i" varying from 1 to "m" and "j" varying from 1 to "z." In matrix C2, the measured KPI candidates of the C2 cluster are shown as $KPI_{ij@C2}$ with "i" varying from 1 to "n" and "j" varying from 1 to "z." Moreover, in matrix CNew, the measured KPI candidates of the CNew cluster are shown as $KPI_{ij@CNew}$ with "i" varying from 1 to "1" and "j" varying from 1 to "z."

Figure 9:
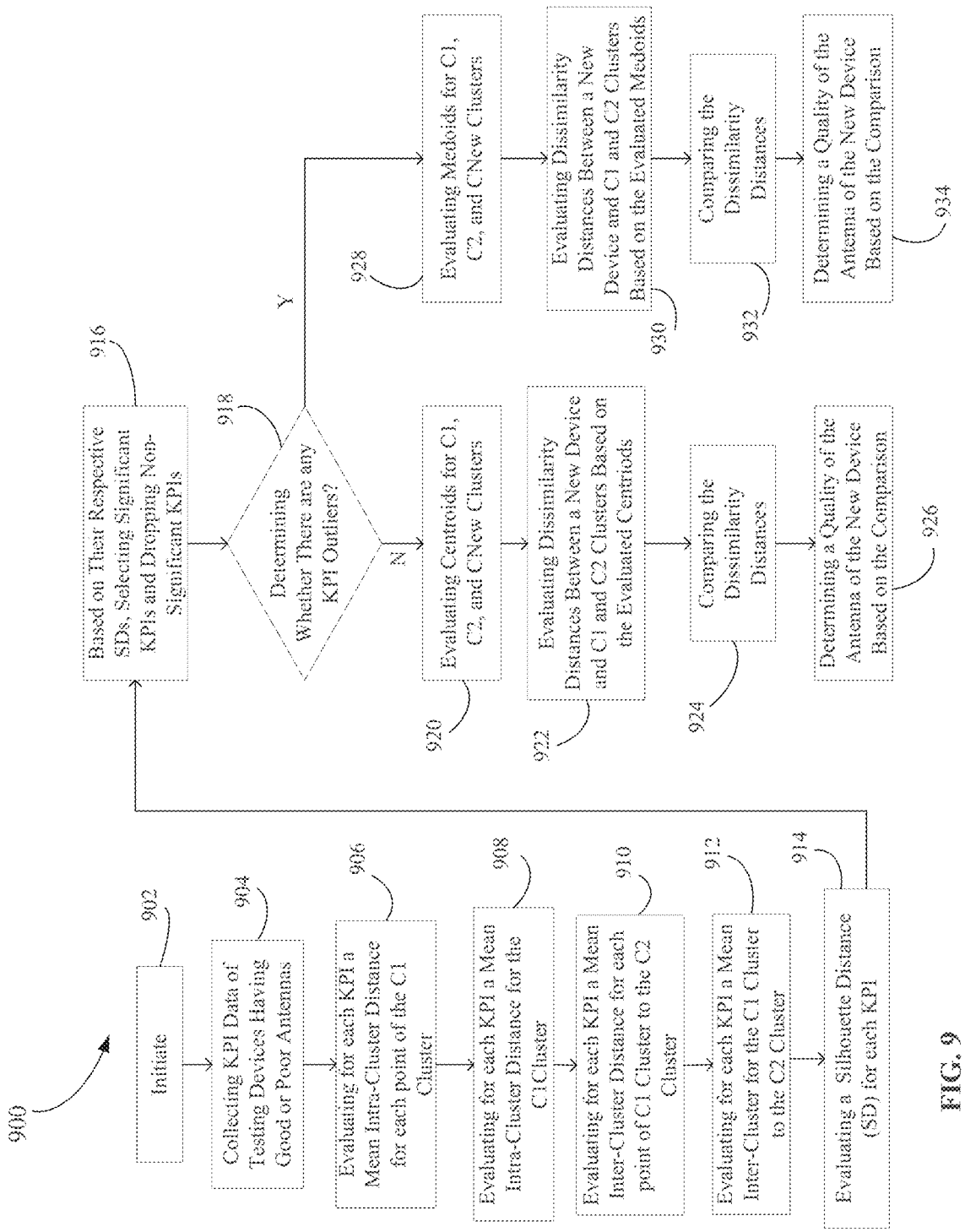
FIG. 9 illustrates an exemplary process for determining whether a new device falls within a good antenna cluster or a poor antenna cluster.

FIG. 9 illustrates an exemplary process for determining whether a new device falls within a good antenna cluster or a poor antenna cluster. As stated above, KPI candidates may include CRR, RSSI, TxPower, RSRP, RSRQ, SINR, PDSCHBLER, and RxPower indicators. For this example of process 900, C1 denotes a good antenna cluster, C2 denotes a poor antenna cluster, and CNew denotes a new device set (i.e., test set). Once initiated at Step 902, process 900 is configured to collect all of the KPI measurement data from data warehouse 220 that correspond to the testing devices have a good antenna and associated with the C1 cluster, and to the testing devices have a poor antenna and associated with the C2 cluster, at Step 904.

Figure 10:
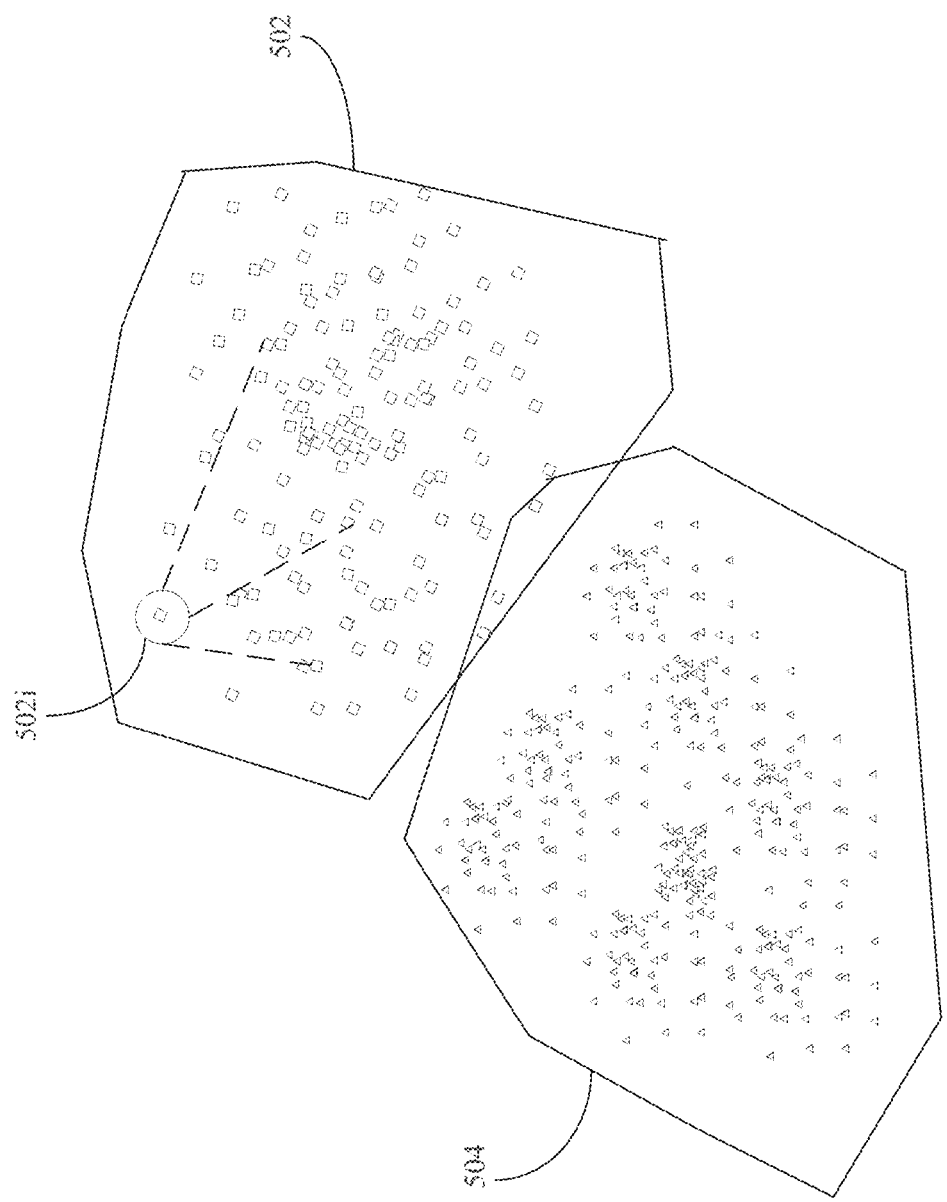
FIGS. 10-15 are a plurality of graphs, each of which corresponds to an antenna classification activity performed by the process shown in FIG. 9.

Then at Step 906, process 900 is configured to evaluate a mean intra-cluster Euclidean distance for each measurement point of C1 cluster to all points in the C1 cluster. In one example, process 900 selects one of the z KPIs, such as the CRR indicator, hereafter referred to as KPIx, and randomly picks a measurement point "i" 502i to evaluate a Euclidian distance (ED) that separates a measurement point "i" from each of the other "m" measurement points of the C1 cluster, as illustrated in FIG. 10. Once all of the "m−1" Euclidean distances have been evaluated, process 900 is configured to evaluate a mean ED of the measurement point "i" using the following Equation 1:

$$IntraED_{i,KPIx,C1} = \frac{\sum_{j=1}^{m} \sqrt{(KPI_{i,C1} - KPI_{j,C1})^2}}{m-1}, j \neq i \quad \text{Equation 1}$$

Figure 11:
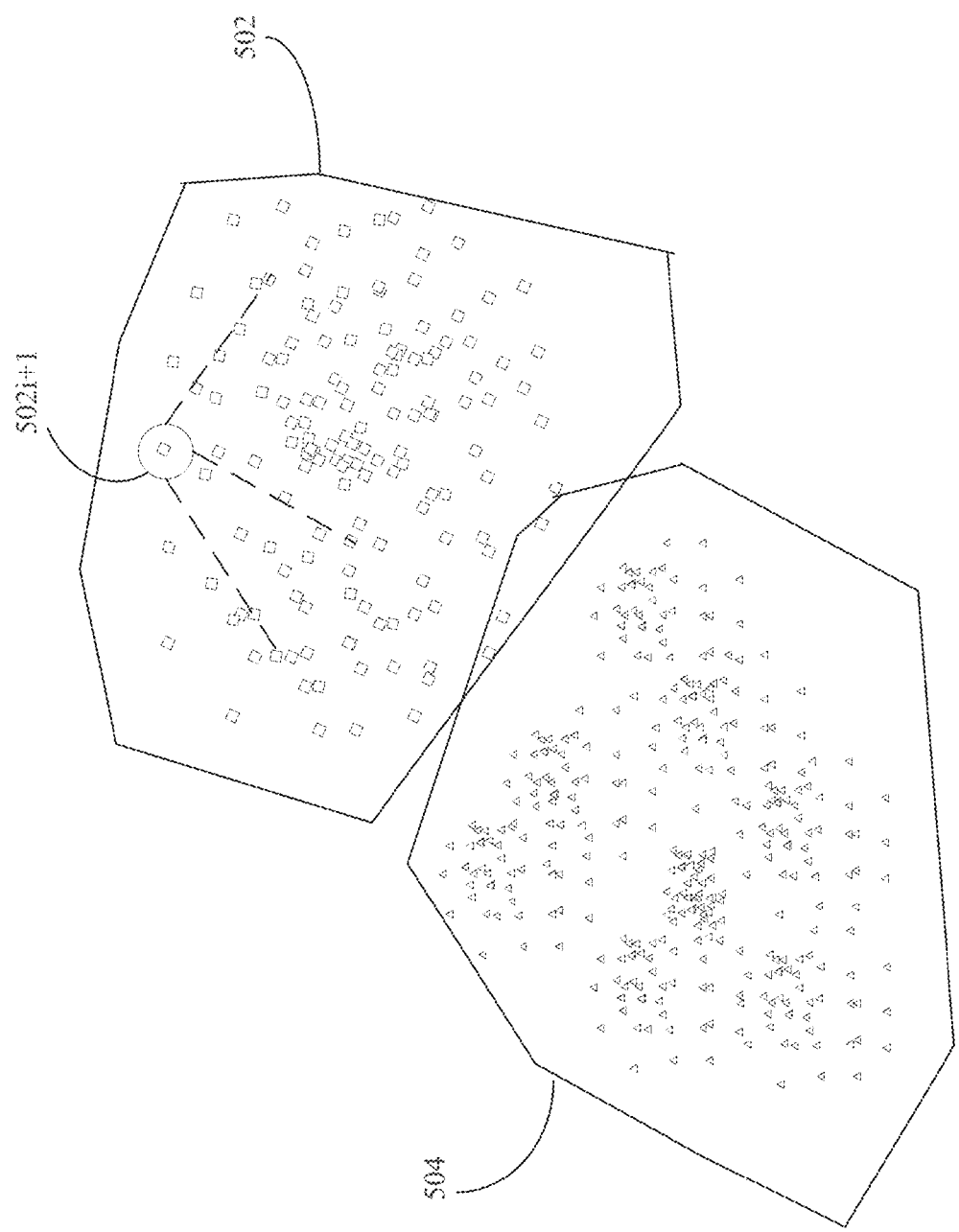

Subsequently, process 900 is configured to evaluate a mean intra-cluster Euclidean distance for the C1 Cluster, which is indicative of an extent to which KPIx homogenizes the C1 cluster, at Step 908. Accordingly, process 900 is configured to pick the next measurement point "i+1" to evaluate a Euclidian distance (ED) that separates measurement point "i+1" 502i+1, as shown in FIG. 11, from each of the other "m" measurement points of the C1 cluster. Once all of the "m−1" Euclidean distances have been evaluated, process 900 is configured to evaluate a mean ED of measurement point "i+1" using Equation 1. Process 900 is then configured to repeat the evaluation of the mean intra-cluster for all of the remaining measurement points of the C1 cluster. Once all of the "m" EDs have been evaluated, process 1000 is configured to evaluate a mean intra-cluster ED for the C1 cluster using the following Equation 2:

$$IntraED_{KPIx,C1} = \frac{\sum_{i=1}^{m} IntraED_{i,KPIx,C1}}{m-1} \quad \text{Equation 2}$$

Figure 12:
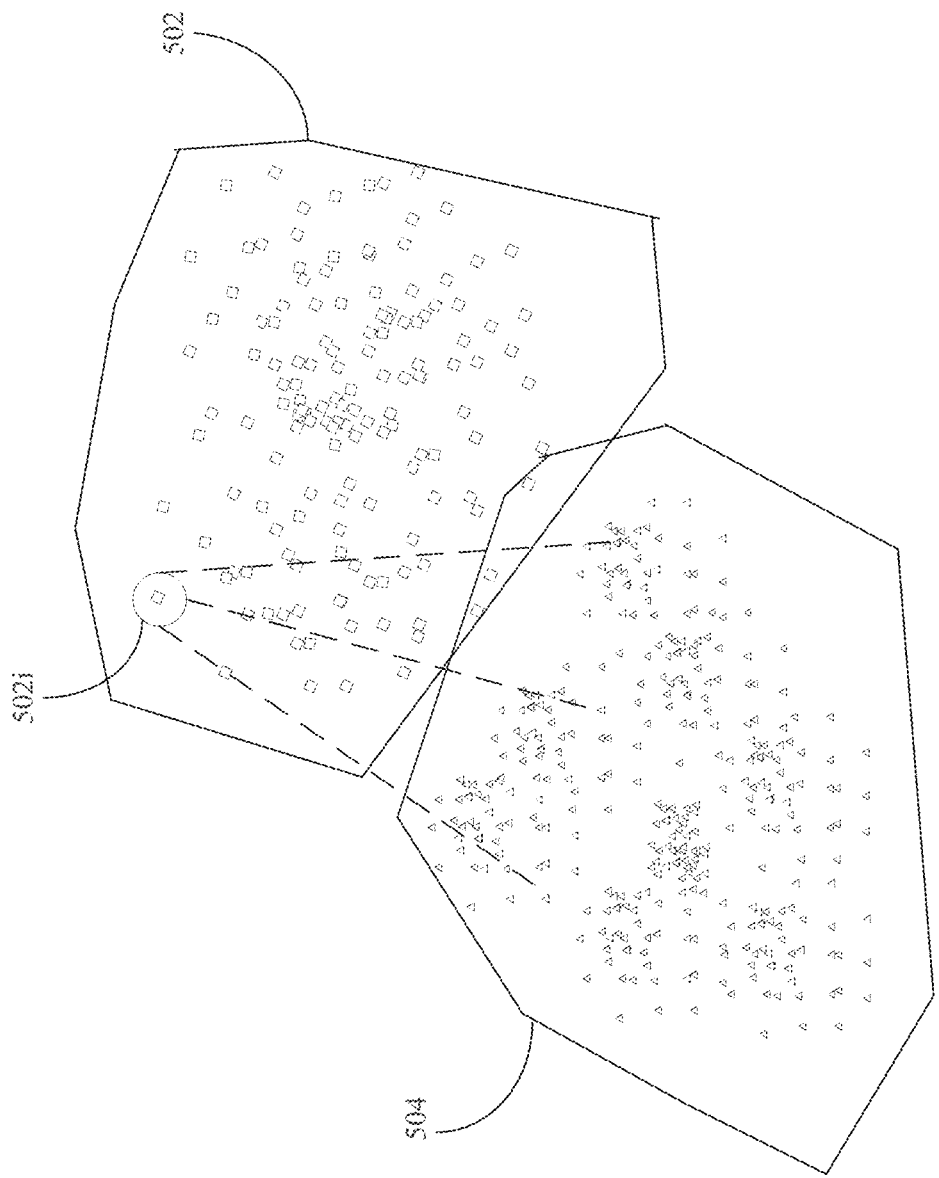

At step 910, process 900 is configured to evaluate a mean inter-cluster Euclidean distances for a measurement point that corresponds to one of the devices of the C1 cluster to all of the points of the C2 cluster. In one example, process 900 selects the same KP of the z KPIs, such as call retention rate, and randomly picks a measurement point "i" to evaluate a Euclidian distance (ED) that separates measurement point "i" from each of the other "n" measurement points of the C2 cluster, as illustrated in FIG. 12. Once all of the "n−1" Euclidean distances have been evaluated, process 900 is configured to evaluate a mean ED of measurement point "i" using the following Equation 3:

$$InterED_{i,KPIx,C1C2} = \frac{\sum_{p=1}^{m} \sqrt{(KPIx_{i,C1} - KPIx_{p,C1C2})^2}}{n} \quad \text{Equation 3}$$

Subsequently, at Step 912, process 900 is configured to evaluate a mean inter-cluster Euclidean distance for the C1 Cluster, which is indicative of an extent to which KPIx heterogenizes the C1 cluster from the C2 cluster. Accordingly, process 900 is configured to pick the next measurement point "i+1" to evaluate a Euclidian distance (ED) that separates measurement point "i+1" from each of the other "n" measurement points of the C2 cluster. Once all of the "n−1" Euclidean distances have been evaluated, process 900 is configured to evaluate a mean ED of measurement point "i+1" shown in FIG. 13, using Equation 3. Process 900 is then configured to repeat the evaluation of the mean ED for all of the remaining measurement points of the C2 cluster. Once all of the "n" EDs have been evaluated, process 900 is configured to evaluate a mean inter-cluster ED for the C1 cluster using the following Equation 4:

$$InterED_{KPIx,C1C2} = \frac{\sum_{i=1}^{m} InterED_{i,KPIx,C1C2}}{m} \quad \text{Equation 4}$$

Subsequently, at Step 914, process 900 is configured to evaluate a silhouette distance for the selected KPIx candidate between the C1 cluster and the C2 cluster. This silhouette distance $SD_{KPIx,C1C2}$ is evaluated using the following equation 5:

$$SD_{KPIx,C1C2} = \frac{InterED_{i,KPIx,C1C2} - IntraED_{KPIx,C1}}{\text{Max}\{InterED_{i,KPIx,C1C2}, IntraED_{KPIx,C1}\}} \quad \text{Equation 5}$$

Accordingly, based on the evaluated intra-cluster EDs and the inter-cluster EDs used to evaluate $SD_{KPIx,C1C2}$, a range value $SD_{KPIx,C1C2}$ is bounded by −1 on a low end and by +1 on an upper end. Accordingly, if the value of $SD_{KPIx,C1C2}$ is close to 1, then KPIx qualifies as a significant feature in clustering the pre-commercially manufactured devices. If the value of $SD_{KPIx,C1C2}$ is close to −1, then KPIx is considered to be an adverse feature in the clustering of the pre-commercially manufactured devices. Moreover, if the value of $SD_{KPIx,C1C2}$ is close to zero "0", then KPIx qualifies to be a non-significant feature in the clustering of the pre-commercially manufactured devices.

Then, process 900 is configured to repeat the previous steps for all of the selected z KPIs, and then generate a silhouette matrix that includes all of the z SDs, starting with $SD_{KPI1,C1C2}$ and ending with $SD_{KPIx,C1C2}$. Subsequently, process 900 is configured to select KPIs that have positive values, and preferably not close to zero. In one implementation, at Step 916, process 900 is configured to select significant KPIs whose SDs are not smaller than 0.5, i.e., SD>=0.5. Then, after the feature selection is completed, all of non-significant KPIs are dropped, and only the selected significant KPIs are kept in the above-introduced matrix C1, matrix C2 and matrix CNew. In one example, if only a number "y" of SDs have a value that is equal to or greater than 0.5, then matrices C1, C2 and CNew are reduced item-wise as shown below:

| $KPIx_{11@C1}$ | $KPIx_{12@C1}$ | $KPIx_{1Y@C1}$ | Matrix C1 |
| $KPIx_{21@C1}$ | $KPIx_{22@C1}$ | $KPIx_{2Y@C1}$ | |
| | | | |
| $KPIx_{m1@C1}$ | $KPIx_{m2@C1}$ | $KPIx_{mY@C1}$ | |
| $KPIx_{11@C2}$ | $KPIx_{12@C2}$ | $KPIx_{1Y@C2}$ | Matrix C2 |
| $KPIx_{21@C2}$ | $KPIx_{22@C2}$ | $KPIx_{2Y@C2}$ | |
| | | | |
| $KPIx_{n1@C2}$ | $KPIx_{n2@C2}$ | $KPIx_{nY@C2}$ | |
| $KPIx_{11@C2}$ | $KPIx_{12@C2}$ | $KPIx_{1Y@C2}$ | Matrix CNew |
| $KPIx_{21@C2}$ | $KPIx_{22@C2}$ | $KPIx_{2Y@C2}$ | |
| | | | |
| $KPIx_{m1@C2}$ | $KPIx_{m2@C2}$ | $KPIx_{mY@C2}$ | |

Alternatively, in order to determine which KPIs qualify as significant features in the clustering of the pre-commercially manufactured devices, the mean intra-cluster EDs, the mean inter-cluster EDs, and the SDs may be evaluated for the C2 cluster.

Figure 14:
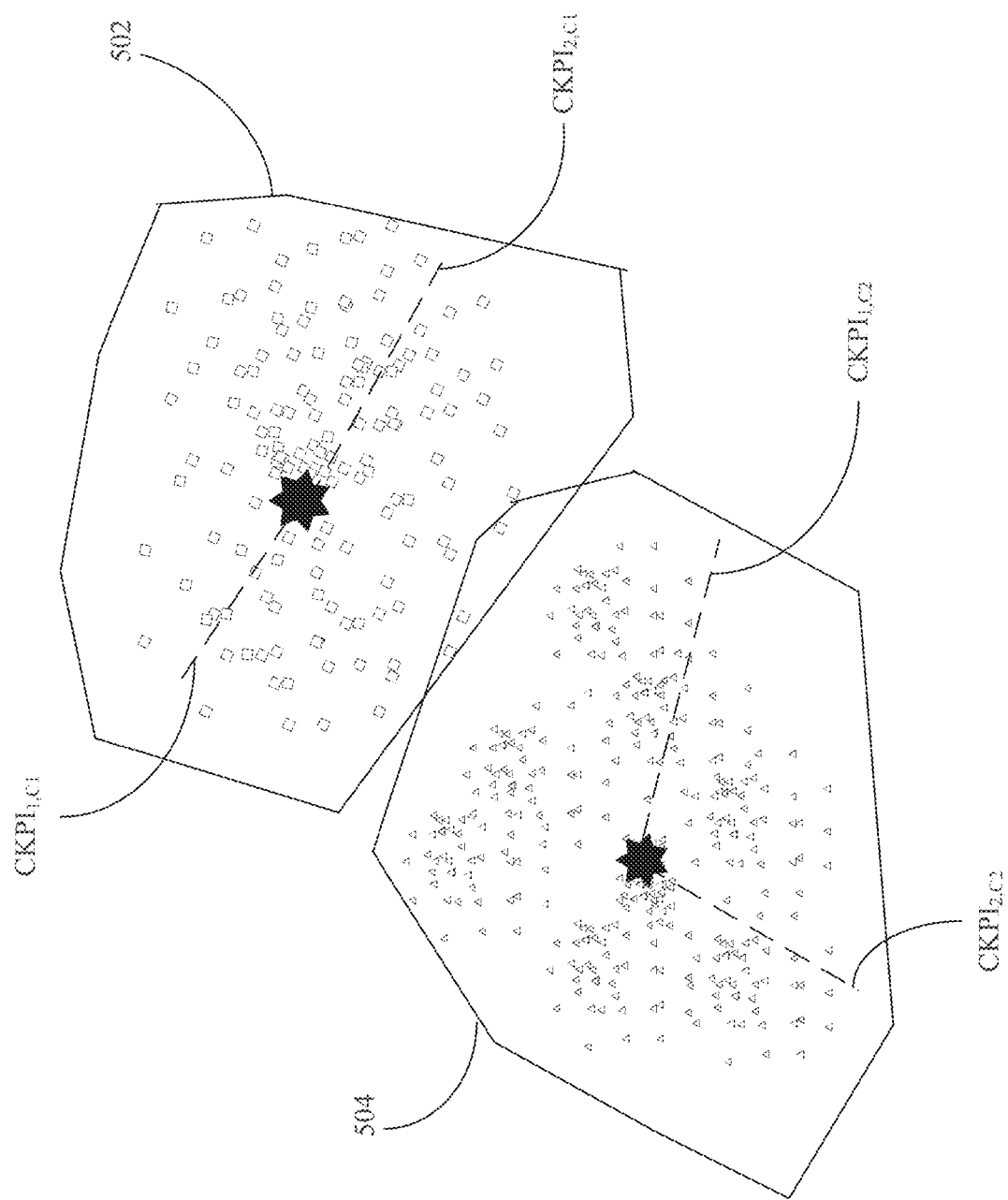

As stated above, following a feature selection of significant KPIs, process 900 is configured to determine for each significant KPI a centroid for each one of C1 cluster, C2 cluster, and the new device data set. As known to one of ordinary skill in the art, the measured training data may include one or more KPIs that qualify as outliers with regard to their respective clusters, i.e., C1 or C2. As such, if the selected significant KPIs include outliers, then process 900 is configured to determine a medoid (i.e., a median) instead of a centroid. Accordingly, at Step 918, process 900 is configured to determine whether there are any KPI outliers. In the negative, at Step 920, process 900 proceeds with the evaluation of a centroid for each of the "y" KPIs for each of the C1 and C2 clusters and the new device data set, which will be hereafter referred to as $Centroid_{KPIi,C1}$ or $CKPI_{i,C1}$, as $Centroid_{KPIi,C2}$ or $CKPI_{i,C2}$, and as $Centroid_{KPIi,CNew}$ or $CKPI_{i,CNew}$, as shown in FIG. 14, with "i" varying from 1 to "y". As known to one of ordinary skill in the art, a centroid of a set of y points is a point that minimizes a sum of squared Euclidean distances between itself and each of the y points, e.g., a geometric center.

Subsequently, at Step 922, once all of the CKPI centroids have been evaluated, process 900 is configured to evaluate dissimilarity distances from the new device to the C1 cluster and to the C2 cluster. In one implementation, the dissimilarity distances $DD_{CNEWC1}$ and $DD_{CNEWC2}$ are evaluated using the following equations 6 and 7:

$$DD_{CNewC1} = \sqrt{\sum_{x=1}^{Y}(KCentroid_{KPIx,CNew} - Centroid_{KPIx,C1})^2} \quad \text{Equation 6}$$

$$DD_{CNewC2} = \sqrt{\sum_{x=1}^{Y}(KCentroid_{KPIx,CNew} - Centroid_{KPIx,C2})^2} \quad \text{Equation 7}$$

Figure 13:
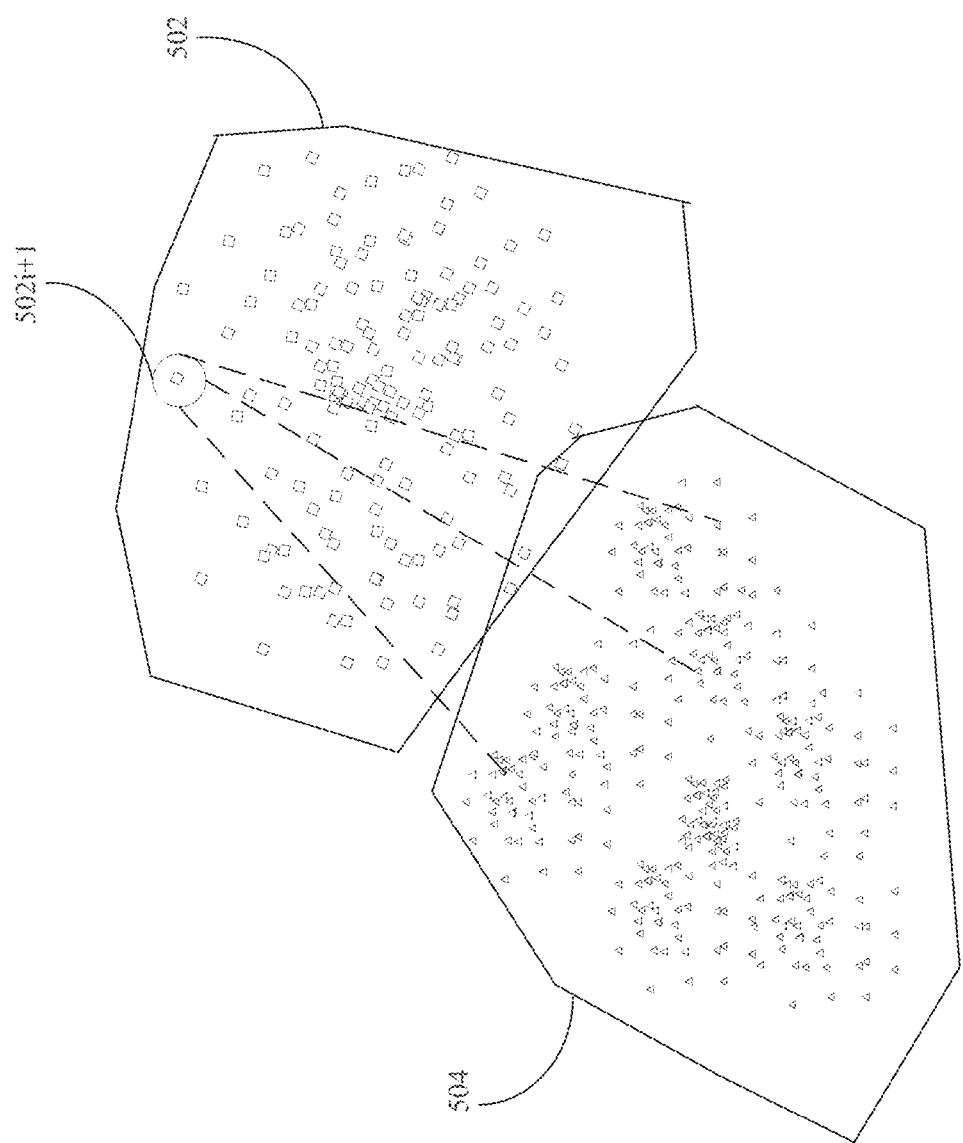

In accordance with the present disclosure, based on the evaluated dissimilarity distances $DD_{CNEWC1}$ and $DD_{CNEWC2}$, at Step 924, process 900 proceeds to compare the values of $DD_{CNEWC1}$ and $DD_{CNEWC2}$ in order to determine an antenna quality of the new device, at Step 926. Accordingly, if the value of $DD_{CNEWC1}$ is found to be greater than that of $DD_{CNEWC2}$, then the antenna quality of the new device is considered to be good, and the new device can be a member of the C1 cluster, as illustrated in FIG. 13. If the value of $DD_{CNEWC1}$ is found to be less than that of $DD_{CNEWC2}$, then the antenna quality of the new device is considered to be poor. Moreover, if the value of $DD_{CNEWC1}$ is found to be equal to that of $DD_{CNEWC2}$, then the quality of the new device is considered to be neutral, i.e., neither poor nor good.

Also as known to one of ordinary skill in the art, because of the substantive distances separating outlier points from the other points of a cluster, a centroid of a cluster having outlier points may be deviated from the centroid that would represent the same cluster without the same outlier points. This deviation of a location of the centroid may weaken the classification process. In order to minimize the impact of the outliers in the determination of a dissimilarity distance from a new device to a cluster that includes outliers, process 800 is configured to evaluate medoids (i.e., medians) for that cluster, which are known to minimize the average distances to all of the points in the cluster. As such, by evaluating medoids instead of centroids, process 1000 improves the accuracy of the classification.

Accordingly, as a replacement to the evaluation of centroids because of discovered outliers, at Step 928, process 900 is configured to evaluate a medoid for each of the "y" KPIs for each of C1 and C2 clusters and the new device data set, which will be hereafter referred to as $Medoid_{KPIi,C1}$ or $MKPI_{i,C1}$, as $Medoid_{KPIi,C2}$ or $MKPI_{i,C2}$, and as $Medoid_{KPIi,CNew}$ or $MKPI_{i,CNew}$ with "i" varying from 1 to "y". Subsequently, once all of the MKPI medoids have been evaluated, at Step 930, process 900 is configured to evaluate dissimilarity distances from the new device to the C1 cluster and to the C2 cluster. In one implementation, the dissimilarity distances $DD_{CNEWC1}$ and $DD_{CNEWC2}$ are evaluated using the following equations 8 and 9:

$$DD_{CNewC1} = \sqrt{\sum_{x=1}^{Y}(Medoid_{KPIx,CNew} - Medoid_{KPIx,C1})^2} \quad \text{Equation 8}$$

$$DD_{CNewC2} = \sqrt{\sum_{x=1}^{Y}(Medoid_{KPIx,CNew} - Medoid_{KPIx,C2})^2} \quad \text{Equation 9}$$

In accordance with the present disclosure, based on the evaluated dissimilarity distances $DD_{CNEWC1}$ and $DD_{CNEWC2}$, at Step 932, process 900 proceeds to compare the values of $DD_{CNEWC1}$ and $DD_{CNEWC2}$ in order to determine an antenna quality of the new device, at Step 934.

Figure 15:
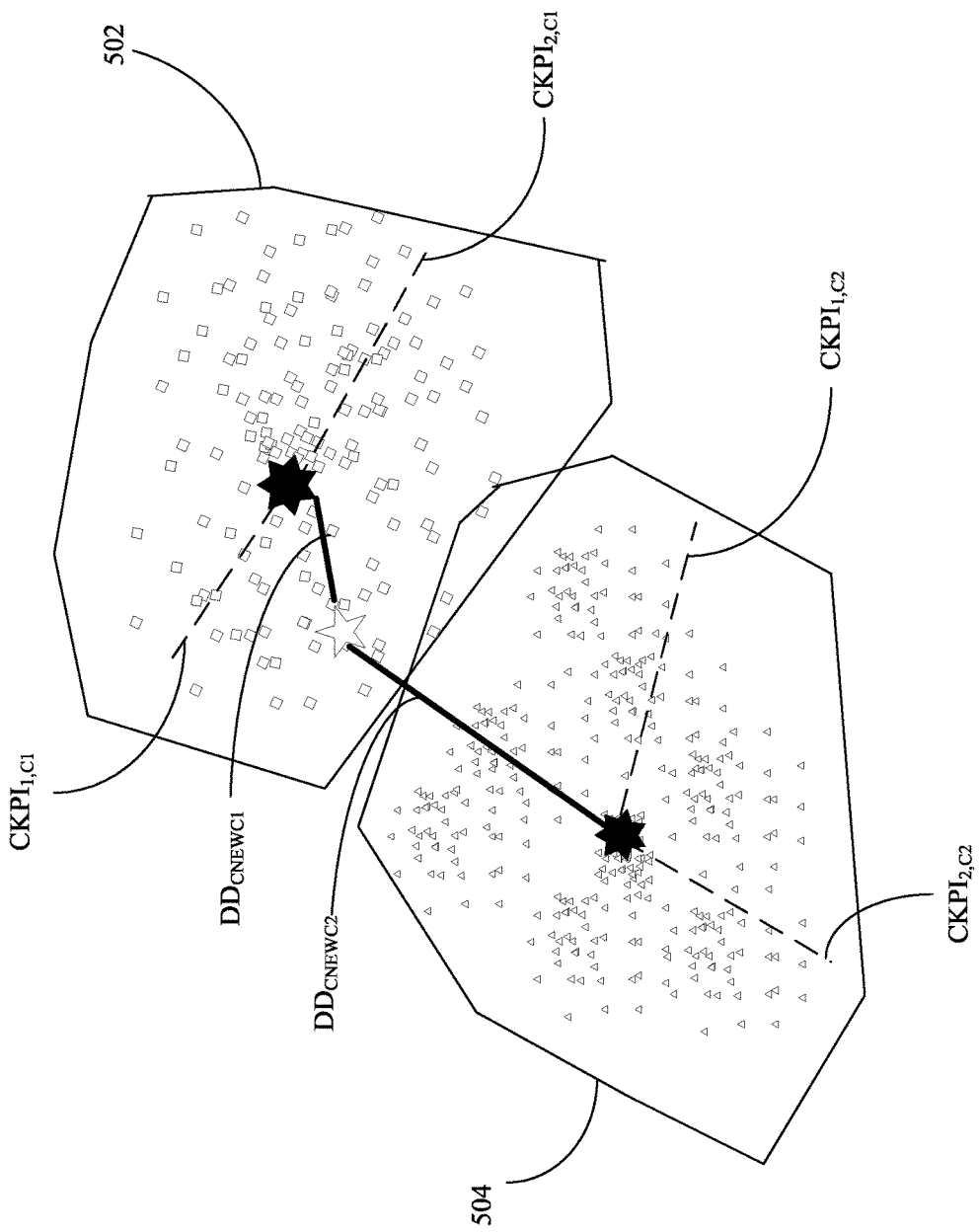

Accordingly, if the value of $DD_{CNEWC1}$ is found to be greater than that of $DD_{CNEWC2}$, then the antenna quality of the new device is considered to be good, and the new device can be a member of the C1 cluster, as illustrated in FIG. 15. If the value of $DD_{CNEWC1}$ is found to be less than that of $DD_{CNEWC2}$, then the antenna quality of the new device is considered to be poor. Moreover, if the value of $DD_{CNEWC1}$ is found to be equal to that of $DD_{CNEWC2}$, then the quality of the new device is considered to be neutral, i.e., neither poor nor good.

Figure 16:
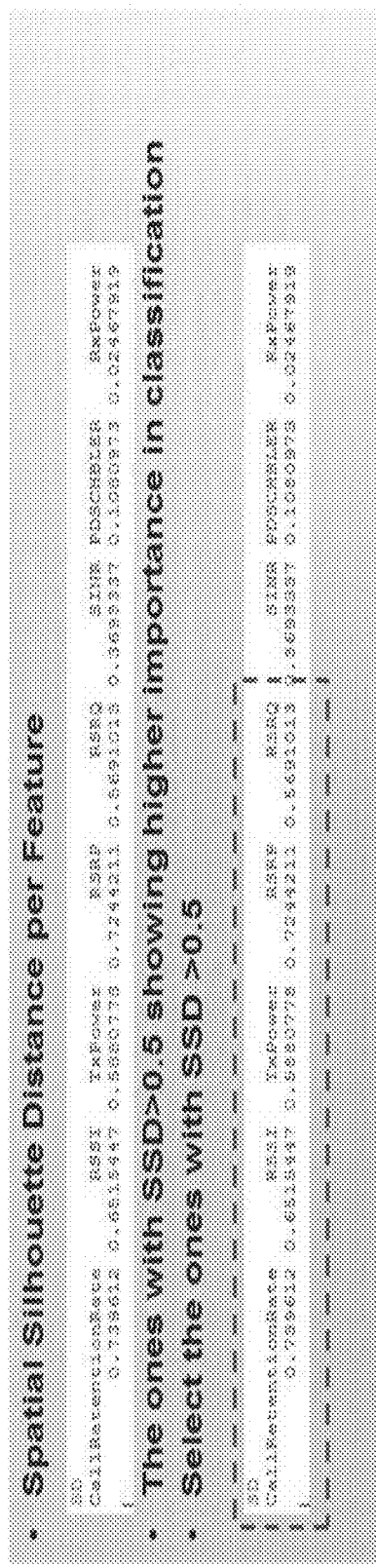
FIG. 16 illustrates a first data set that includes spatial silhouette data for an initial set of KPI features, and a second data set that includes spatial silhouette data for the selected significant KPI features.

In an exemplary testing of the above-discussed antenna quality determination process 900, a testing user selects the above-introduced set of eight KPIs or an alternate set of critical KPIs, which includes Call Retention Rate, RSSI, TxPower, RSRP, RSRQ, SINR, PDSCHBLER, and RxPower. Following the evaluation of the intra-cluster and inter-cluster Euclidean distances, process 900 determines a spatial silhouette distance SD for each of these eight KPIs. As shown in FIG. 16, Call Retention Rate has the highest SD value, which is equal to 0.739612, and RxPower has the smallest SD value, which is equal to 0.02467919. As stated above, KPIs having SD values that are not equal to or greater than 0.5 are considered to be non-significant features in the clustering process. Accordingly, process 900 drops SINR, PDSCHBLER, and RxPower, whose SD values are less than 0.5. As such, only five of the original 8 KPIs are selected and kept for the classification process of the devices.

Figures 18, 19:
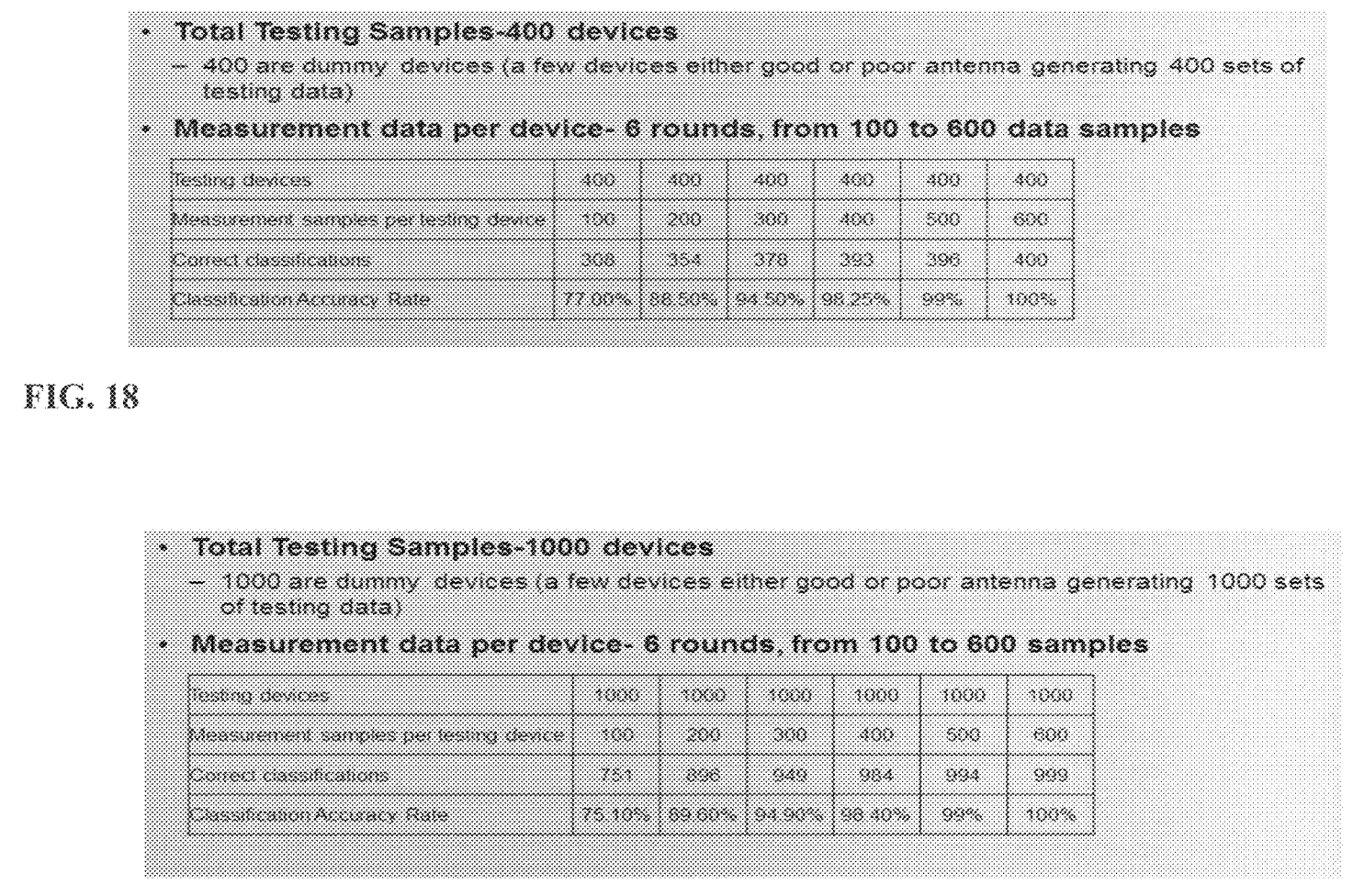
Figure 20:
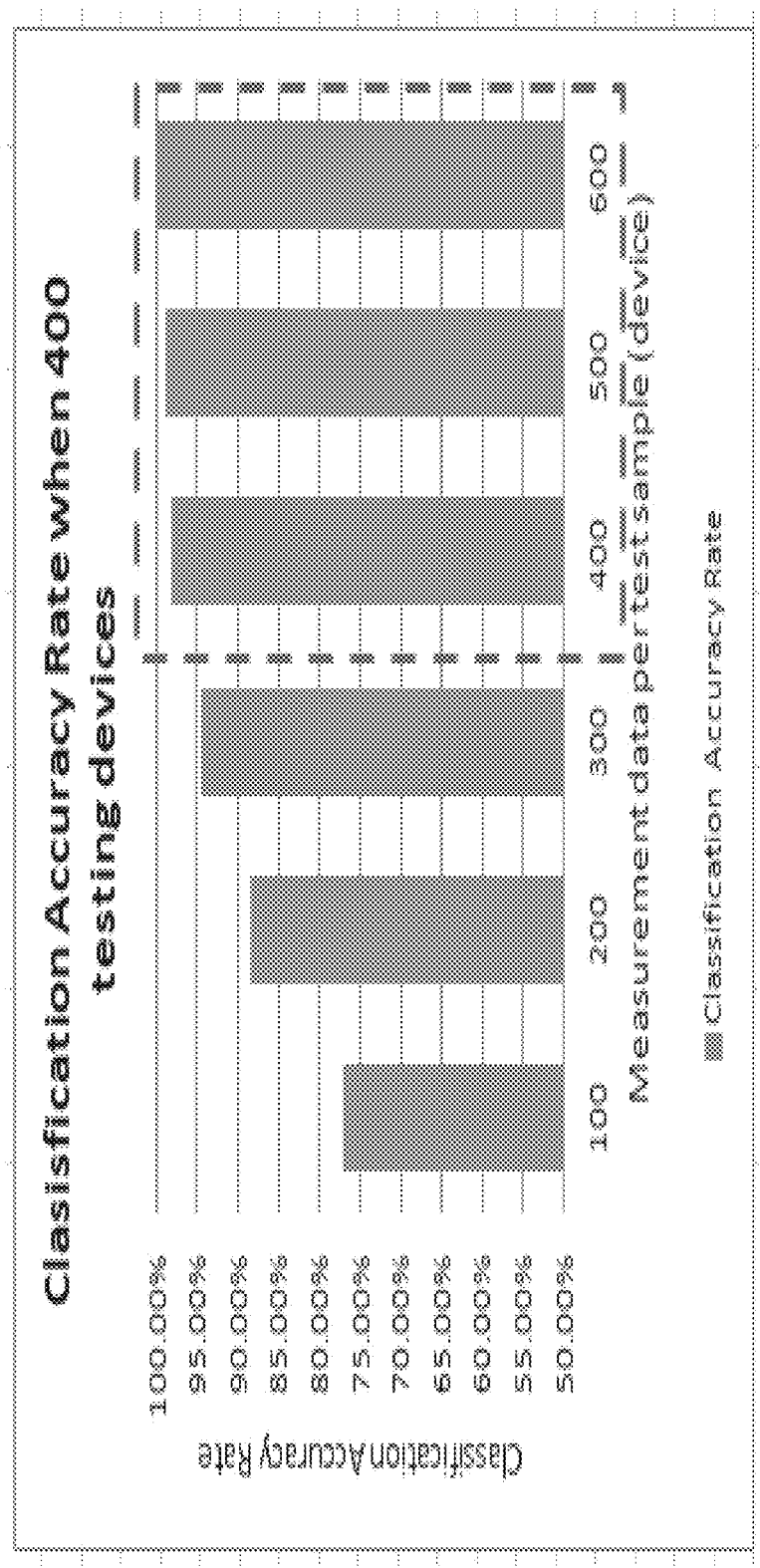
FIG. 20 is a graph that illustrates the varying classification accuracy rate of FIG. 18.
Figure 21:
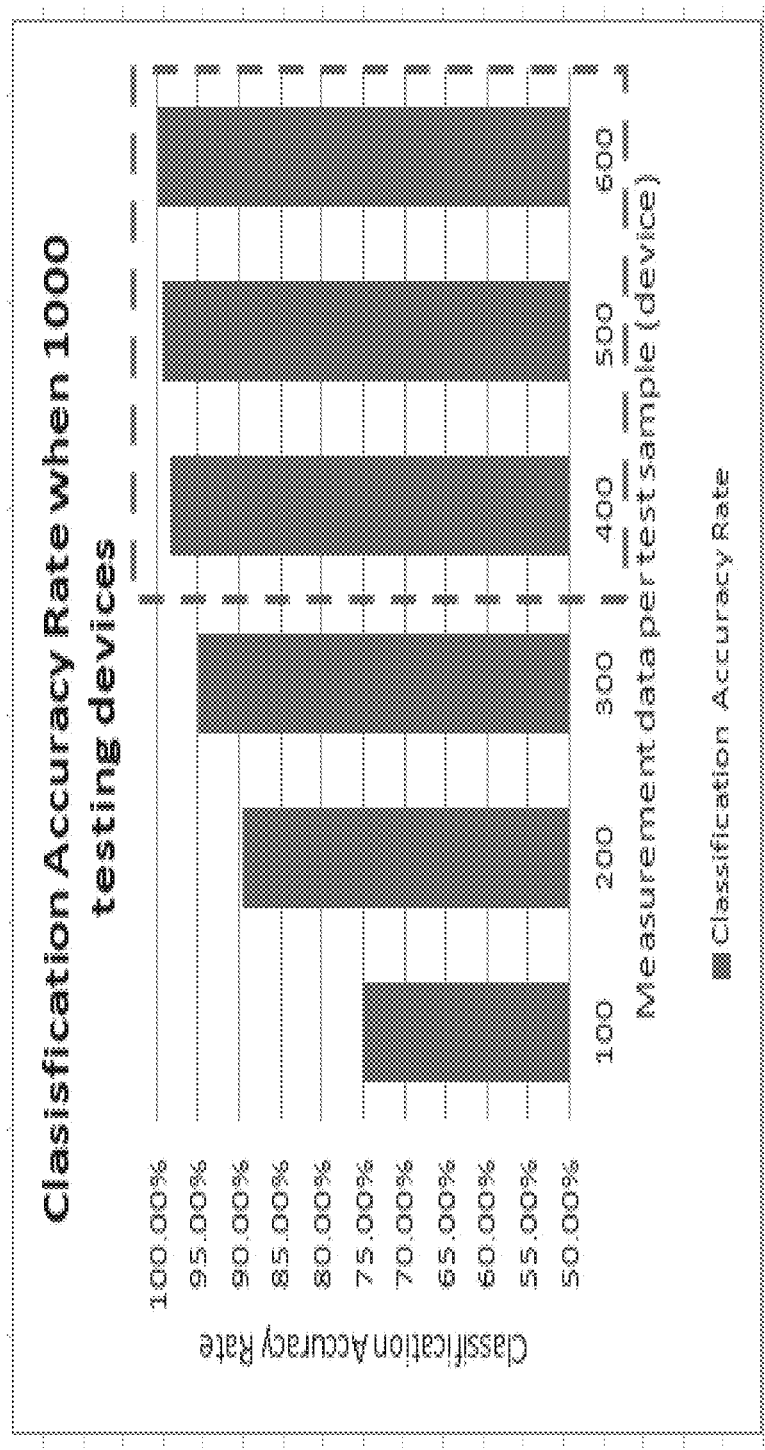
FIG. 21 is a graph that illustrates the varying classification accuracy rate of FIG. 19.

Then process 900 collects testing data of the testing devices associated with the selected 5 KPIs, such as the data shown in FIG. 17. In one implementation, as shown in FIG. 18, the number of testing devices may be equal to 400, and the number of measurement samples per device may vary from 100 to 600. As shown, the classification accuracy rate, determined by process 900 for these 400 testing devices, improves from 77%, when the measurement samples are equal to 100, to 100% when the measurement samples are equal to 600. In another implementation, as shown in FIG. 19, the number of testing devices may be equal to 1000, and the number of measurement samples per device may also vary from 100 to 600. As shown, the classification accuracy rate, as determined by process 900, improves from 75.1% when the measurement samples are equal to 100, to 100% when the measurement samples are equal to 600. As such, as shown in FIGS. 20 and 21, to ensure that an accuracy of the device classification is greater than 95%, it is best to capture and provide more than 400 measurement samples per testing device.

Figure 22:
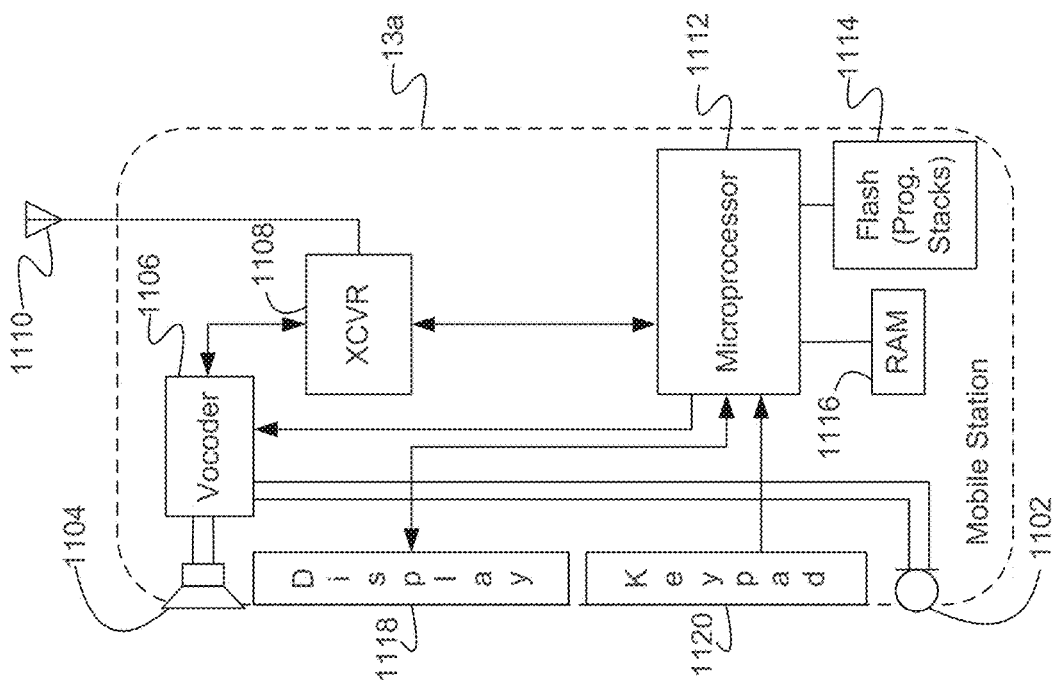
FIG. 22 illustrates a high-level functional block diagram of an exemplary non-touch type mobile station that can be associated with a device quality evaluation service through a network/system like that shown in FIG. 1.

For purposes of such a discussion, FIG. 22 provides a block diagram illustration of an exemplary non-touch type mobile station 13a. Although the mobile station 13a may be a smartphone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 1102 for audio signal input and a speaker 1104 for audio signal output. The microphone 1102 and speaker 1104 connect to voice coding and decoding circuitry (vocoder) 1106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 1108. Today, the handset 13a would be configured for digital wireless communications using one or more of the common network technology types. The concepts discussed here encompass embodiments of the mobile station 13a utilizing any digital transceivers that conform to current or future developed digital wireless communication standards. The mobile station 13a may also be capable of analog operation via a legacy network technology.

The transceiver 1108 provides two-way wireless communication of information, such as vocoded speech samples and/or digital information, in accordance with the technology of the network 15. The transceiver 1108 also sends and receives a variety of signaling messages in support of the various voice and data services provided via the mobile station 13a and the communication network. Each transceiver 1108 connects through RF send and receive amplifiers (not separately shown) to an antenna 1110. The transceiver may also support various types of mobile messaging services, such as short message service (SMS), enhanced messaging service (EMS) and/or multimedia messaging service (MMS).

The mobile station 13a includes a display 1118 for displaying messages, menus or the like, call related information dialed by the user, calling party numbers, etc., including information related to evaluating antenna quality. A keypad 1120 enables dialing digits for voice and/or data calls as well as generating selection inputs, for example, as may be keyed-in by the user based on a displayed menu or as a cursor control and selection of a highlighted item on a displayed screen. The display 1118 and keypad 1120 are the physical elements providing a textual or graphical user interface. Various combinations of the keypad 1120, display 1118, microphone 1102 and speaker 1104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during evaluating antenna quality.

A microprocessor 1112 serves as a programmable controller for the mobile station 13a, in that it controls all operations of the mobile station 13a in accord with programming that it executes, for all normal operations, and for operations involved in the evaluating antenna quality under consideration here. In the example, the mobile station 13a includes flash type program memory 1114, for storage of various "software" or "firmware" program routines and mobile configuration settings, such as mobile directory number (MDN) and/or mobile identification number (MIN), etc. The mobile station 13a may also include a non-volatile random access memory (RAM) 1116 for a working data processing memory. Of course, other storage devices or configurations may be added to or substituted for those in the example. In a present implementation, the flash type program memory 1114 stores firmware such as a boot routine, device driver software, an operating system, call processing software and vocoder control software, and any of a wide variety of other applications, such as client browser software and short message service software. The memories 1114, 1116 also store various data, such as telephone numbers and server addresses, downloaded data such as multimedia content, and various data input by the user. Programming stored in the flash type program memory 1114, sometimes referred to as "firmware," is loaded into and executed by the microprocessor 1112.

As outlined above, the mobile station 13a includes a processor, and programming stored in the flash memory 1114 configures the processor so that the mobile station is capable of performing various desired functions, including in this case the functions involved in the technique for evaluating antenna quality.

Figure 23:
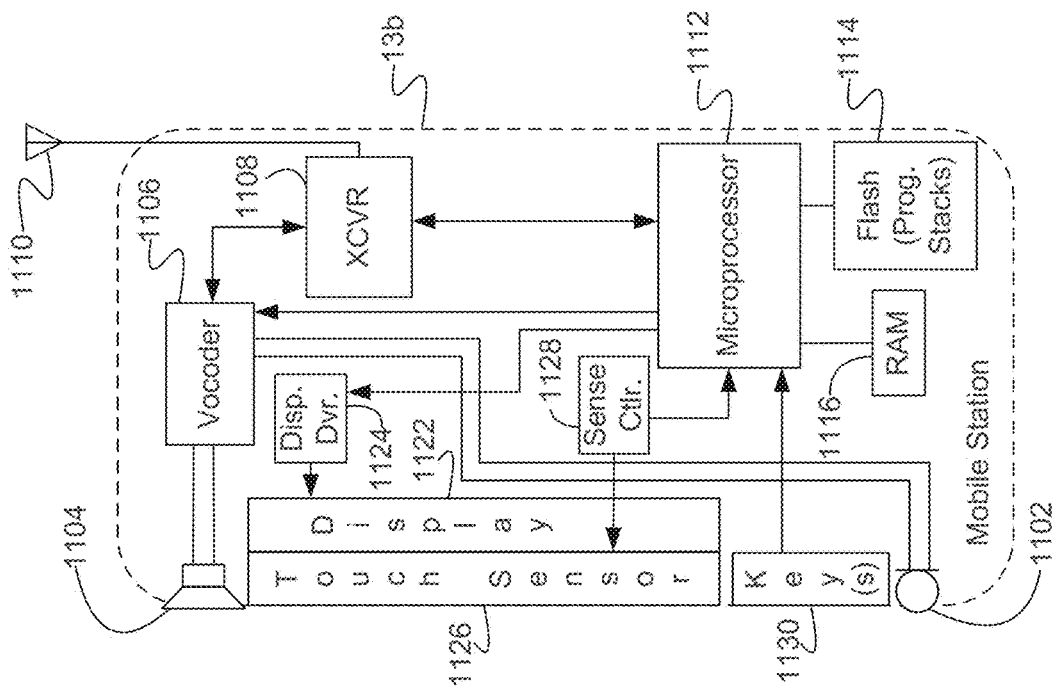
FIG. 23 illustrates a high-level functional block diagram of an exemplary touch screen type mobile station that can be evaluated by the device quality evaluation service through a network/system like that shown in FIG. 1.

For purposes of such a discussion, FIG. 23 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 23. For example, the touch screen type mobile station 13b includes a microphone 1102, speaker 1104 and vocoder 1106, for audio input and output functions, much like in the earlier example. The mobile station 13b also includes at least one digital transceiver (XCVR) 1108, for digital wireless communications, although the handset 13b may include an additional digital or analog transceiver. The concepts discussed here encompass embodiments of the mobile station 13b utilizing any digital transceivers that conform to current or future developed digital wireless communication standards. As in the station 13a, the transceiver 1108 provides two-way wireless communication of information, such as vocoded speech samples and/or digital information, in accordance with the technology of the network 15. The transceiver 1108 also sends and receives a variety of signaling messages in support of the various voice and data services provided via the mobile station 13b and the communication network. Each transceiver 1108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 1112 serves as a programmable controller for the mobile station 13b, in that it controls all operations of the mobile station 13b in accord with programming that it executes, for all normal operations, and for operations involved in evaluating antenna quality under consideration here. In the example, the mobile station 13b includes flash type program memory 1114, for storage of various program routines and mobile configuration settings. The mobile station 13b may also include a non-volatile random access memory (RAM) 1116 for a working data processing memory. Of course, other storage devices or configurations may be added to or substituted for those in the example. Hence, outlined above, the mobile station 13b includes a processor, and programming stored in the flash memory 1114 configures the processor so that the mobile station is capable of performing various desired functions, including in this case the functions involved in the technique for evaluating device readiness.

In the example of FIG. 23, the user interface elements included a display 1122 and a keypad 1130. The mobile station 13b may have a limited number of key 1130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 1122, which the microprocessor 112 controls via a display driver 1124, to present visible outputs to the device user. The mobile station 13b also includes a touch/position sensor 1126. The sensor 1126 is relatively transparent, so that the user may view the information presented on the display 1122. A sense circuit 1128 sensing signals from elements of the touch/position sensor 1126 and detects occurrence and position of each touch of the screen formed by the display 1122 and sensor 1126. The sense circuit 1128 provides touch position information to the microprocessor 1112, which can correlate that information to the information currently displayed via the display 1122, to determine the nature of user input via the screen.

The display 1122 and touch sensor 1126 (and possibly one or more keys 1130, if included) are the physical elements providing the textual and graphical user interface for the mobile station 13b. The microphone 1102 and speaker 1104 may be used as additional user interface elements, for audio input and output, including with respect to some functions related to evaluating antenna quality.

The structure and operation of the mobile stations 13a and 13b, as outlined above, were described to by way of example, only.

As shown by the above discussion, functions relating to evaluating antenna quality, via a graphical user interface of a mobile station may be implemented on computers connected for data communication via the components of a packet data network, operating as an analytics engine of FIG. 1. Although special purpose devices may be used, such devices also may be implemented using one or more hardware platforms intended to represent a general class of data processing device commonly used to run "server" programming so as to implement evaluating device readiness for market discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for evaluating device readiness. The software code is executable by the general-purpose computer that functions as the analytics engine and/or that functions as a mobile terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for evaluating antenna quality, in essentially the manner performed in the implementations discussed and illustrated herein.

FIGS. 24 and 25 provide functional block diagram illustrations of general purpose computer hardware platforms. FIG. 24 illustrates a network or host computer platform, as may typically be used to implement a server. FIG. 25 depicts a computer with user interface elements, as may be used to implement a personal computer or other type of work station or terminal device, although the computer of FIG. 25 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs. A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of evaluating antenna quality outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the wireless network provider into the computer platform of the analytics engine. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the analytics engine, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 26:
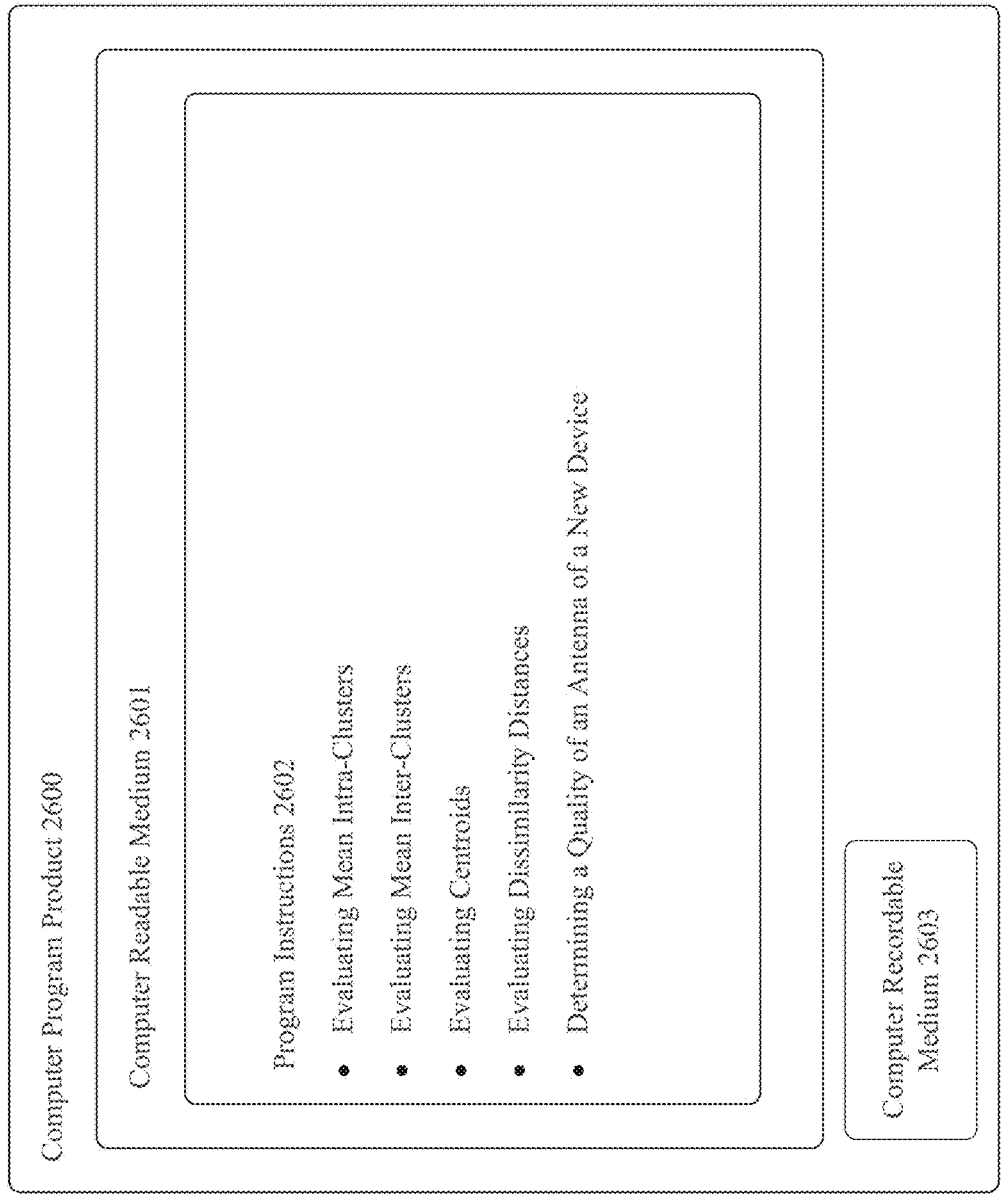
FIG. 26 is a schematic diagram illustrating a conceptual partial view of an example computer program product.

In some examples, the discussed methods may be implemented as computer program instructions encoded on a computer-readable storage media in a machine-readable format. FIG. 26 is a schematic diagram illustrating a conceptual partial view of an example computer program product 2600 that includes a computer program for executing a computer process on a computing device, arranged according to at least some examples presented herein. The example computer program product 2600 may be provided using a non-transitory computer readable medium 2601. The non-transitory computer readable medium 2601 may include one or more programming instructions 2602 that, when executed by one or more processors may provide functionality or portions of the functionality described above with respect to FIGS. 2-21. Thus, for example, referring to the example shown in FIG. 9, one or more features of blocks 902, 904, 906, 908, 910-932, and/or 934 may be undertaken by one or more instructions associated with the non-transitory computer readable medium 2601.

In some implementations, the non-transitory computer readable medium 2601 may encompass a computer recordable medium 2603, such as, but not limited to, memory, read/write (R/W) CDs, R/W DVDs, etc. The one or more programming instructions 2602 may be, for example, computer executable and/or logic implemented instructions.

As stated above, an organization, such as a wireless network provider, may determine the quality of antennas of newly manufactured (post-commercial) mobile devices that have been manufactured by certain manufacturers for customers of the wireless network provider, using the above-described process. Once a quality of an antenna of a post-commercial device is determined using critical key performance indicators, the wireless network provider may proceed to inform the manufacturer about the quality of the antenna of that device. Moreover, if the device has a good quality antenna, the wireless network provider may inform the manufacturer that similar devices, which have been recently manufactured or are currently being similarly manufactured, may be added to its network. However, if the device has a poor quality antenna, the wireless network provider may inform the manufacturer that similar devices, which have been recently or are currently being manufactured, may not be added to its network because. Moreover, the wireless network provider may advise the manufacturer to interrupt the on-going manufacturing and supply of similar devices, and should recall similar devices that have already been sold. As a follow-up, the manufacturer may subject such devices to an OTA performance test to determine what device modifications to implement in order to raise the quality of their antennas.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, via a processor, over-the-air (OTA) performance test data measured for a first set of computing devices and for a second set of computing devices, wherein the first set of computing devices passed the OTA performance test and the second set of computing device failed the OTA performance test, and wherein the computing devices of the first set and the second set are associated with a similar computing device type;
measuring a first set of training data for the first and second sets of computing devices during a plurality of tests, each performed for one of a plurality of key performance indicators (KPIs);
measuring a second set of training data for a particular computing device during the plurality of tests, wherein the particular computing device is similar to the computing device type;
determining which ones of the plurality of KPIs qualify as features to separate into clusters the first set of computing devices from the second set of computing devices based on the first set of training data;
determining a first set of KPI centers, each of which corresponds to one of the feature qualified KPIs, for the first set of computing devices, a second set of KPI centers for the second set of computing devices, and a third set of KPI centers for the particular computing device;
determining a first dissimilarity distance separating the first set of computing devices and the particular computing device using the first set of KPI centers and the third set of KPI centers;
determining a second dissimilarity distance separating the second set of computing devices and the particular computing device using the second set of KPI centers and the third set of KPI centers;
determining which of the first dissimilarity distance and the second dissimilarity distance is greater; and
based on a result of the determining which of the first dissimilarity distance and the second dissimilarity distance is greater, qualifying the particular computing device to pass or fail the OTA test.

2. The method of claim 1, wherein the particular computing device is qualified to pass the OTA test if the first dissimilarity distance is determined to be greater than the second dissimilarity distance.

3. The method of claim 1, wherein the particular computing device is qualified to fail the OTA test if the second dissimilarity distance is determined to be greater than the first dissimilarity distance.

4. The method of claim 1, wherein the first set of computing devices is determined to have passed the OTA because each of the first set of computing devices has an antenna of good quality, and wherein the second set of computing devices failed to pass the OTA because each one has an antenna of poor quality.

5. The method of claim 1, wherein the particular computing device has an antenna of good quality when the first dissimilarity distance is determined to be greater than the second dissimilarity distance.

6. The method of claim 1, wherein the particular computing device has an antenna of poor quality when the second dissimilarity distance is determined to be greater than the first dissimilarity distance.

7. The method of claim 1, wherein determining which ones of the plurality of KPIs qualify as features to cluster the first set of computing devices from the second set of computing devices comprises:
    evaluating for each of the plurality of KPIs a mean intra-cluster distance for the first set of computing devices;
    evaluating for each of the plurality of KPIs a mean inter-cluster distance from the first set of computing devices to the second set of computing devices;
    evaluating for each of the plurality of KPIs a silhouette distance between the first set of computing devices and the second set of computing devices using the mean intra-cluster distances and the mean inter-cluster distances; and
    determining that one of the plurality of KPIs qualifies as a clustering feature when a corresponding silhouette distance is equal to or greater a predetermined positive value that is greater than zero and less than one.

8. The method of claim 1, wherein each of the determined KPI centers is a centroid.

9. The method of claim 1, wherein each of the determined KPI centers is a median, and wherein the medians are determined when the plurality of KPIs include a preset number of outliers.

10. The method of claim 1, wherein determining a first dissimilarity distance includes using centroids as KPI centers.

11. The method of claim 1, wherein determining a first dissimilarity distance includes using medians as KPI centers.

12. An analytics engine comprising:
    a communication interface configured to enable communication via a mobile network;
    a processor coupled with the communication interface;
    a storage device accessible to the processor; and
    an executable program in the storage device, wherein execution of the program by the processor configures the analytics engine to perform functions, including functions to:
        receiving, via the processor, over-the-air (OTA) performance test data measured for a first set of computing devices and for a second set of computing devices, wherein the first set of computing devices passed the over-the-air (OTA) performance test and the second set of computing device failed the OTA performance test, and wherein the computing devices of the first set and the second set are associated with a similar a computing device type;
        measuring a first set of training data for the first and second sets of computing devices during a plurality of tests, each performed for one of a plurality of key performance indicators (KPIs);
        measuring a second set of training data for a particular computing device during the plurality of tests, wherein the particular computing device is similar to the computing device type;
        determining which ones of the plurality of KPIs qualify as features to separate into clusters the first set of computing devices from the second set of computing devices based on the first set of training data;
        determining a first set of KPI centers, each of which corresponds to one of the feature qualified KPIs, for the first set of computing devices, a second set of KPI centers for the second set of computing devices, and a third set of KPI centers for the particular computing device;
        determining a first dissimilarity distance separating the first set of computing devices and the particular computing device using the first set of KPI centers and the third set of KPI centers;
        determining a second dissimilarity distance separating the second set of computing devices and the particular computing device using the second set of KPI centers and the third set of KPI centers;
        determining which of the first dissimilarity distance and the second dissimilarity distance is greater; and
        based on a result of the determining which of the first dissimilarity distance and the second dissimilarity distance is greater, qualifying the particular computing device to pass or fail the OTA test.

13. The analytics engine of claim 12, wherein the particular computing device is qualified to pass the OTA test if the first dissimilarity distance is determined to be greater than second dissimilarity distance.

14. The analytics engine of claim 12, wherein the particular computing device qualifies to fail the OTA test if the second dissimilarity distance is determined to be greater than first dissimilarity distance.

15. The analytics engine of claim 12, wherein the first set of computing devices passed the OTA because each of the first set of computing devices has an antenna of good quality, and wherein the second set of computing devices failed to pass the OTA because each one has an antenna of poor quality.

16. The analytics engine of claim 15, wherein the particular computing device has an antenna of good quality when the first dissimilarity distance is determined to be greater than the second dissimilarity distance.

17. The analytics engine of claim 15, wherein the particular computing device has an antenna of poor quality when the second dissimilarity distance is determined to be greater than the first dissimilarity distance.

18. The analytics engine of claim 12, wherein determining which ones of the plurality of KPIs qualify as features to cluster the first set of computing devices from the second set of computing devices comprises:
    evaluating for each of the plurality of KPIs a mean intra-cluster distance for the first set of computing devices;
    evaluating for each of the plurality of KPIs a mean inter-cluster distance from the first set of computing devices to the second set of computing devices;
    evaluating for each of the plurality of KPIs a silhouette distance between the first set of computing devices and the second set of computing devices using the mean intra-cluster distances and the mean inter-cluster distances; and determining that one of the plurality of KPIs qualifies as a clustering feature when a corresponding silhouette distance is equal to or greater a predetermined positive value that is greater than zero and less than one.

19. A non-transitory computer-readable medium comprising instructions which, when executed by one or more computers, cause the one or more computers to:

receive, via a processor, over-the-air (OTA) performance test data measured for a first set of computing devices and for a second set of computing devices, wherein the first set of computing devices passed the over-the-air (OTA) performance test and the second set of computing device failed the OTA performance test, and wherein the computing devices of the first set and the second set are associated with a similar a computing device type;

measure a first set of training data for the first and second sets of computing devices during a plurality of tests, each performed for one of a plurality of key performance indicators (KPIs);

measure a second set of training data for a particular computing device during the plurality of tests, wherein the particular computing device is similar to the computing device type;

determine which ones of the plurality of KPIs qualify as features to separate into clusters the first set of computing devices from the second set of computing devices based on the first set of training data;

determine a first set of KPI centers, each of which corresponds to one of the feature qualified KPIs, for the first set of computing devices, a second set of KPI centers for the second set of computing devices, and a third set of KPI centers for the particular computing device;

determine a first dissimilarity distance separating the first set of computing devices and the particular computing device using the first set of KPI centers and the third set of KPI centers;

determine a second dissimilarity distance separating the second set of computing devices and the particular computing device using the second set of KPI centers and the third set of KPI centers;

determine which of the first dissimilarity distance and the second dissimilarity distance is greater; and based on a result of determining which of the first dissimilarity distance and the second dissimilarity distance is greater, qualify the particular computing device to pass or fail the OTA test.

20. The non-transitory computer-readable medium of claim 19, wherein the particular computing device qualifies to pass the OTA test if the first dissimilarity distance is determined to be greater than second dissimilarity distance, and wherein the particular computing device qualifies to fail the OTA test if the second dissimilarity distance is determined to be greater than first dissimilarity distance.

* * * * *